United States Patent [19]

Ryan

[11] 4,003,473
[45] Jan. 18, 1977

[54] COMBINED MARINE RAMP TRANSFER AND MOORING SYSTEM

[75] Inventor: William J. Ryan, Loreauville, La.

[73] Assignee: Ryan Ramp, Inc., Harahan, La.

[22] Filed: Aug. 30, 1974

[21] Appl. No.: 501,991

[52] U.S. Cl. .................................. 214/14; 14/71.1; 114/230

[51] Int. Cl.² ........................................ B63B 21/00

[58] Field of Search ........... 14/70, 71 R, 5; 214/12, 214/13, 14, 15 R; 114/230; 280/435

[56] References Cited

UNITED STATES PATENTS

| | | | |
|---|---|---|---|
| 2,212,708 | 8/1940 | Fraser | 280/435 |
| 2,215,903 | 9/1940 | Edwards | 280/435 X |
| 2,803,841 | 8/1957 | Wellens | 14/71 R |
| 3,008,158 | 11/1961 | Stinson | 14/71 R |
| 3,228,051 | 1/1966 | Voase et al. | 114/230 X |
| 3,426,719 | 2/1969 | Mizell | 14/71 X |

FOREIGN PATENTS OR APPLICATIONS

| | | | |
|---|---|---|---|
| 1,394,747 | 10/1963 | France | 214/14 |
| 353,257 | 7/1931 | United Kingdom | 14/71 R |

Primary Examiner—Frank E. Werner
Attorney, Agent, or Firm—C. Emmett Pugh

[57] ABSTRACT

A ramp transfer and mooring system for the transferring of personnel and/or material between two relatively moving objects, such as for example from a boat to an offshore platform, wherein the ramp system permits the safe transfer between the two by a unique, flexible but at least relatively solid design which has the capability of twisting and turning to offset the relative motion and which adjusts the relative motion to a gradual change between the two, and yet still has the capability and solidity to moor and help stabilize any sudden rolling action of the boat. The ramp transfer and mooring system of such a first exemplary embodiment (FIG. 1) includes six basic elements — the ramp structure itself (FIGS. 2–10), the connection means between the ramp and the boat (FIGS. 11–18), and the connection means between the ramp and the stationary platform including a swivel head system (FIGS. 21–23), a king post/pivot deck structure (FIGS. 24–29), and an enclosed counterweight system. A novel system of connecting the ramp to the boat (FIGS. 19 and 20), a special tie back system (FIGS. 31–33) for storing the ramp during storms, and an alternate ramp structure (FIGS. 34 and 35) are also disclosed.

In an alternate embodiment of the invention (boat to boat, FIGS. 36–38), the novel transfer ramp system is composed of three elements — the ramp structure and the two connection means between the ramp and each of two boats — and, having cable stringers, has the capability of being rolled up for storage. This alternate embodiment is a system for, for example, the transfer of personnel and/or material between two objects, both of which move, such as two boats (FIG. 36). An alternate flexible ramp structure (FIGS. 39 and 40) is also disclosed.

In another alternate embodiment of the invention, the system has four components — the ramp structure, the connection means between the ramp and boat, the connection means between the ramp and the stationary platform, and external counterweight means — to permit, for example, the transfer of personnel from a boat to a single stationary pole platform (FIG. 41) or, for example, for transferring fuel between a tanker and a "superport" type facility located offshore through additional piping means (FIGS. 42 and 43).

In still another alternate embodiment (boat/barge), the system has four components — the ramp structure, the connection means between the ramp and a relatively stationary barge, the connection means between the ramp and the boat, and a counterweight dampening structure (FIGS. 44–47).

36 Claims, 51 Drawing Figures

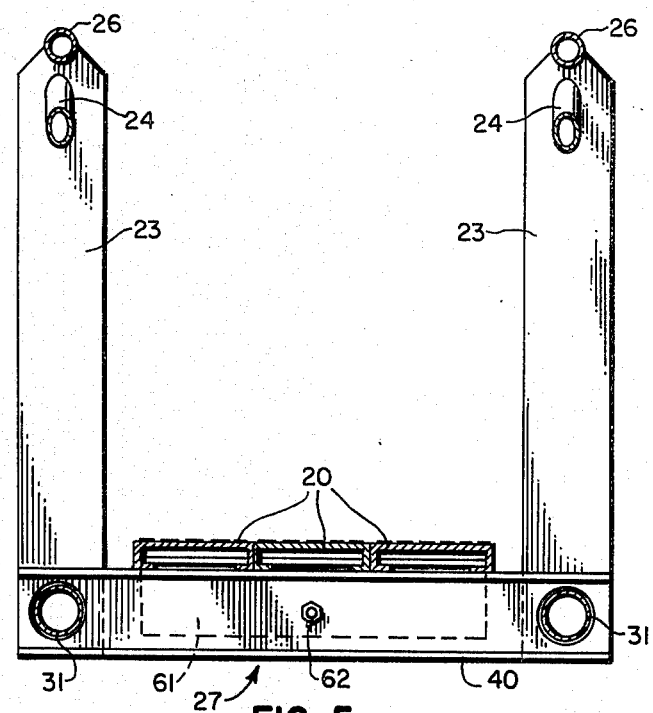
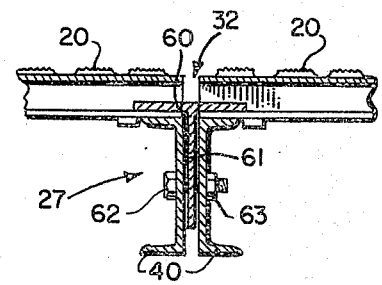
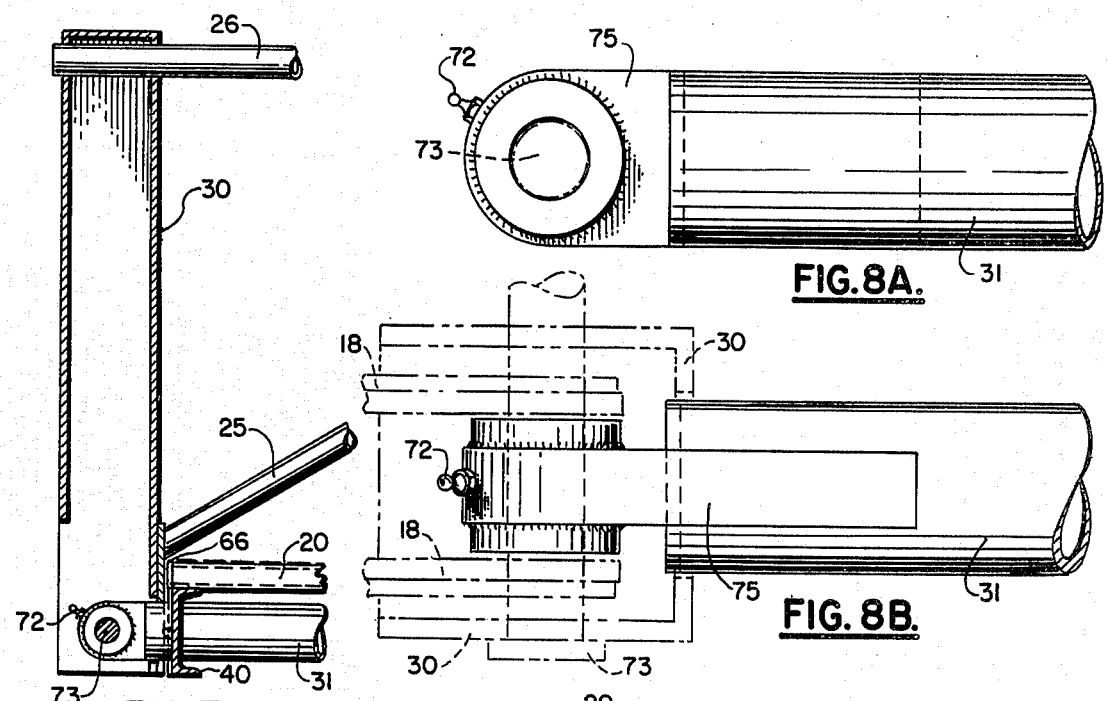
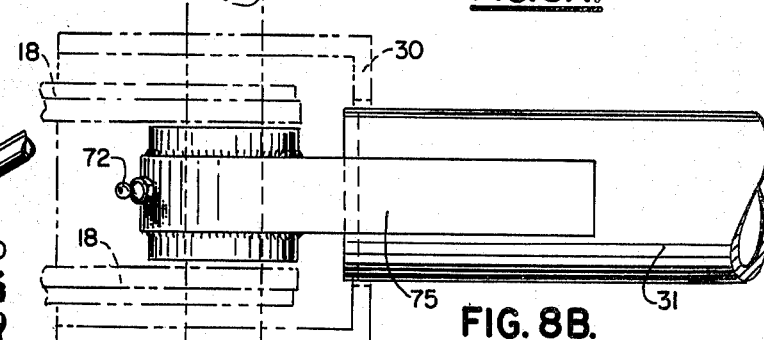
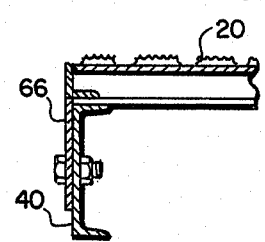
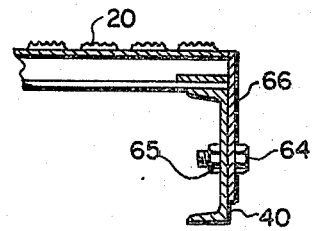

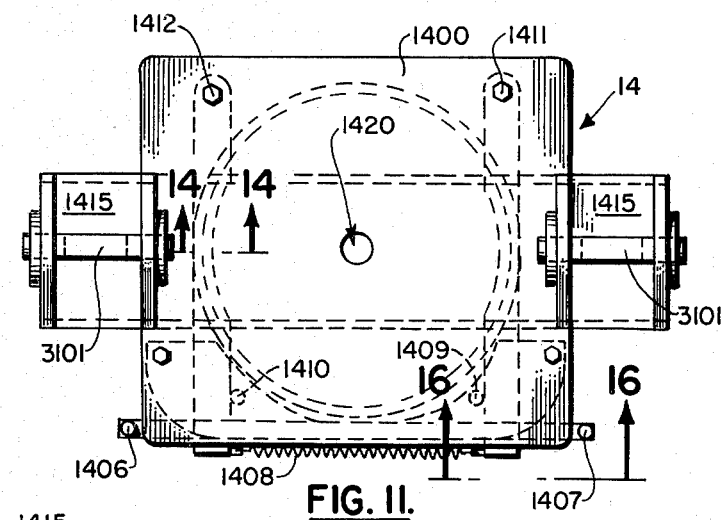
FIG. 11.
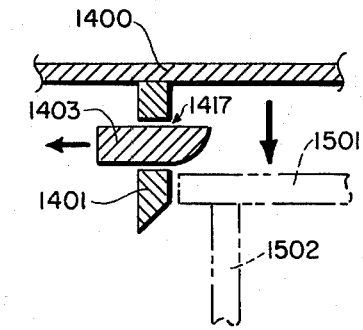
FIG. 14.
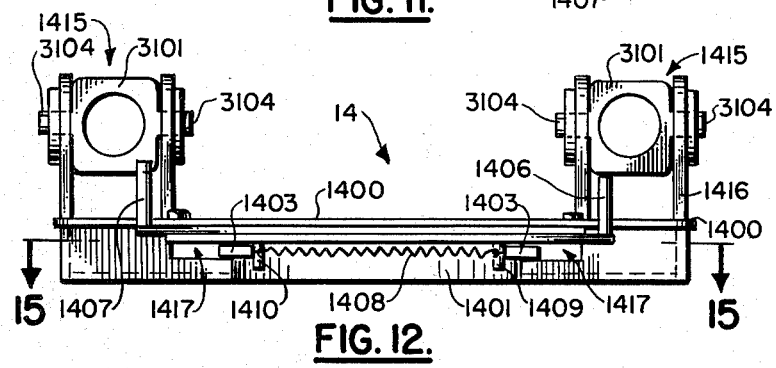
FIG. 12.
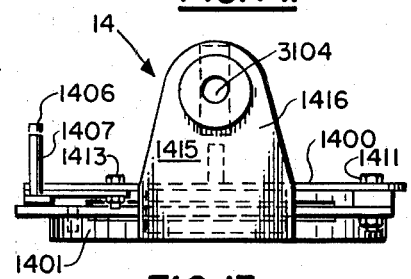
FIG. 13.
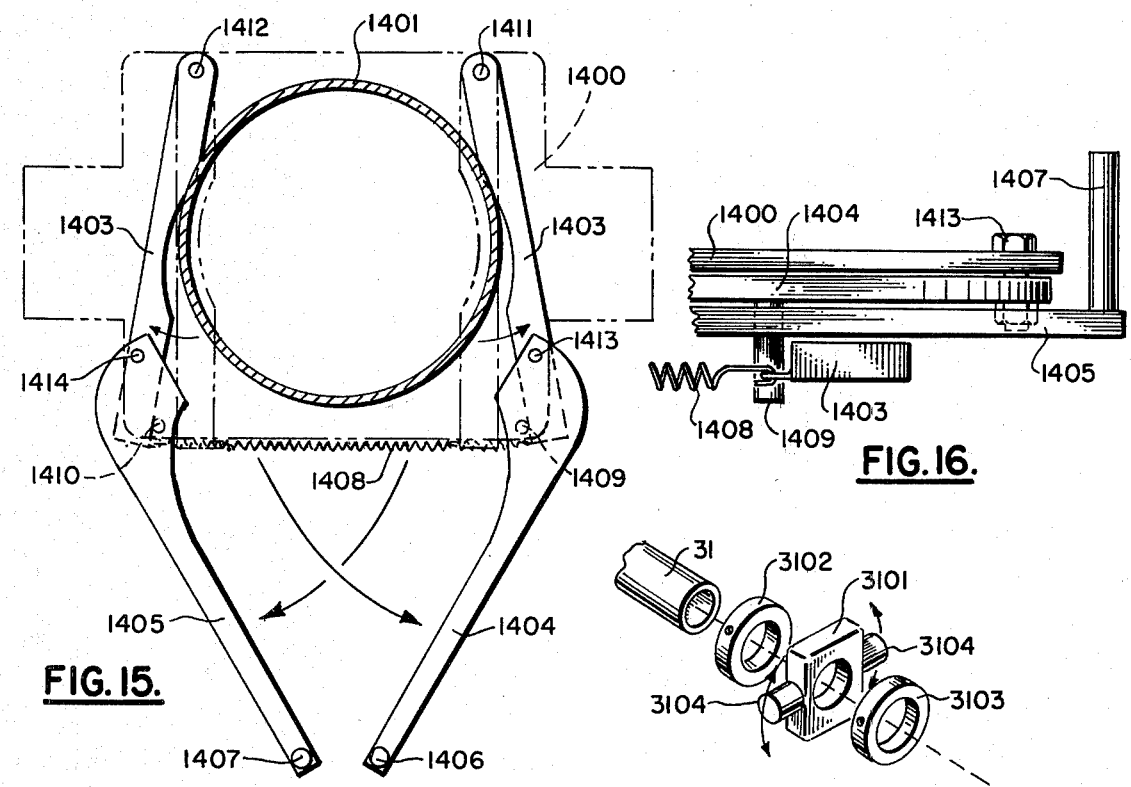
FIG. 15.
FIG. 16.
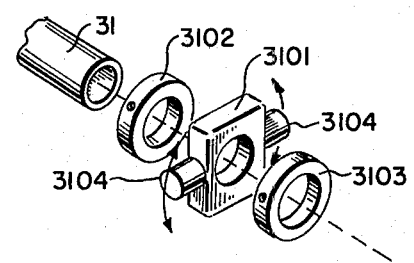
FIG. 12A.

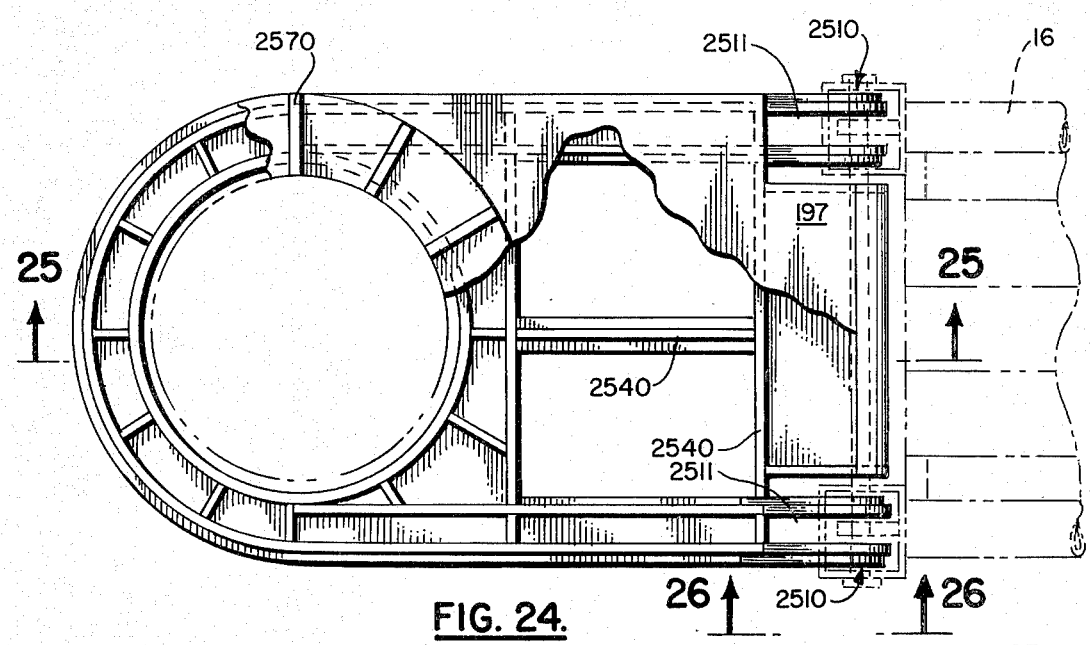
FIG. 24.
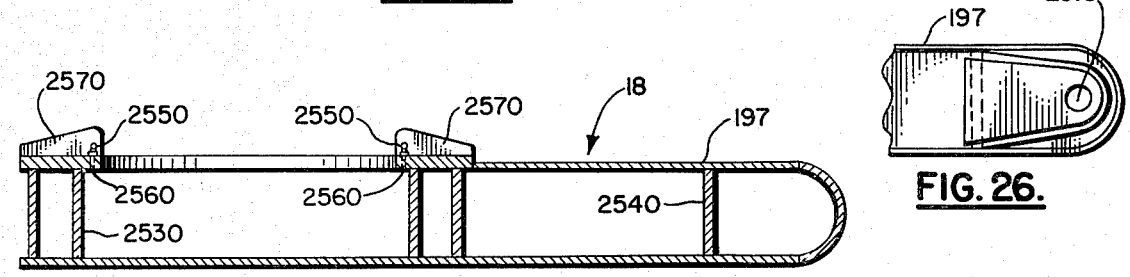
FIG. 25.
FIG. 26.
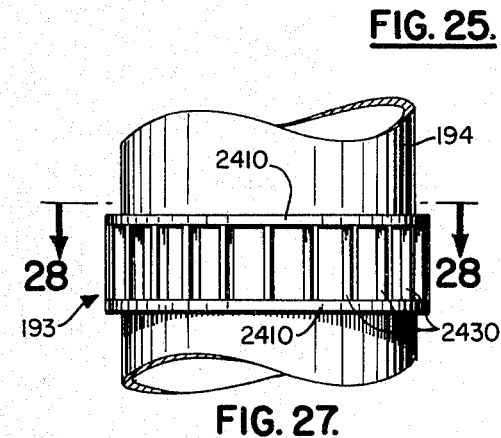
FIG. 27.
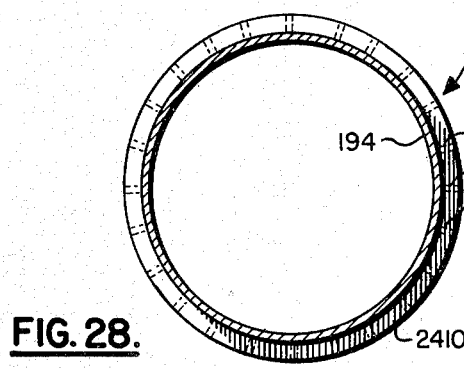
FIG. 28.
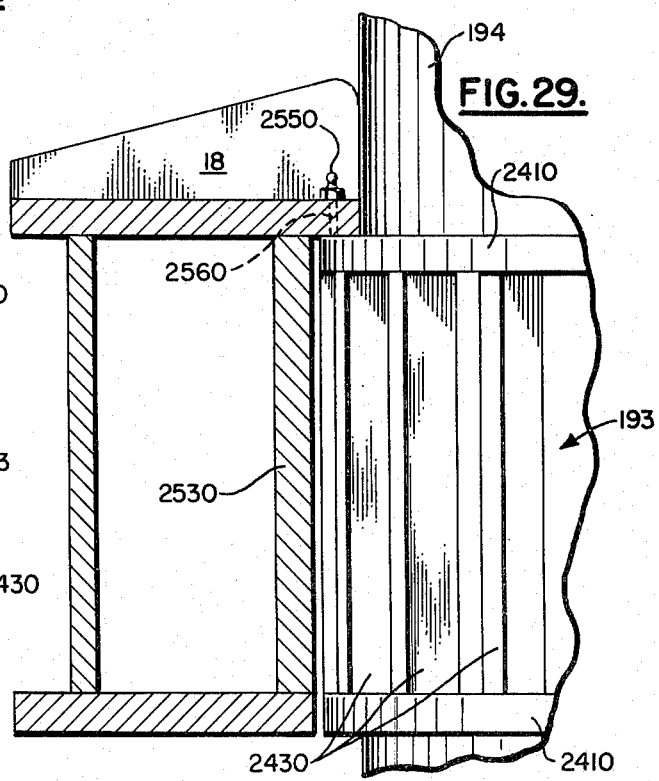
FIG. 29.

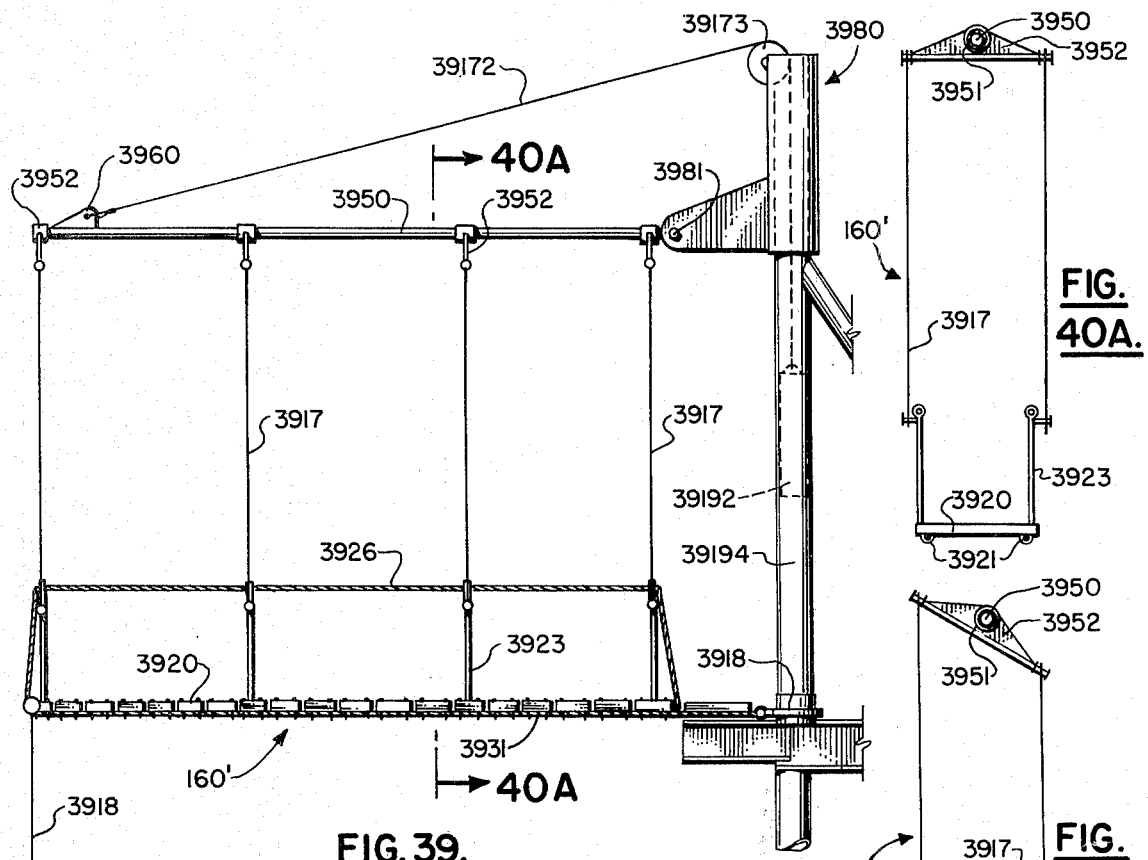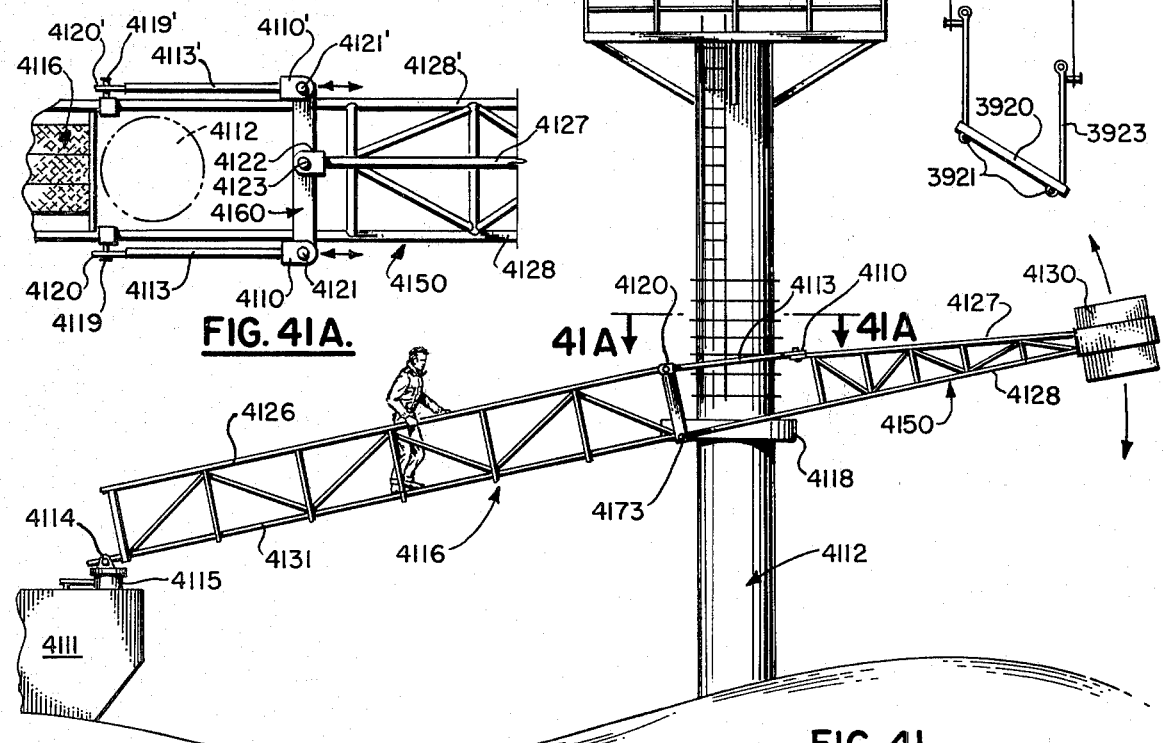

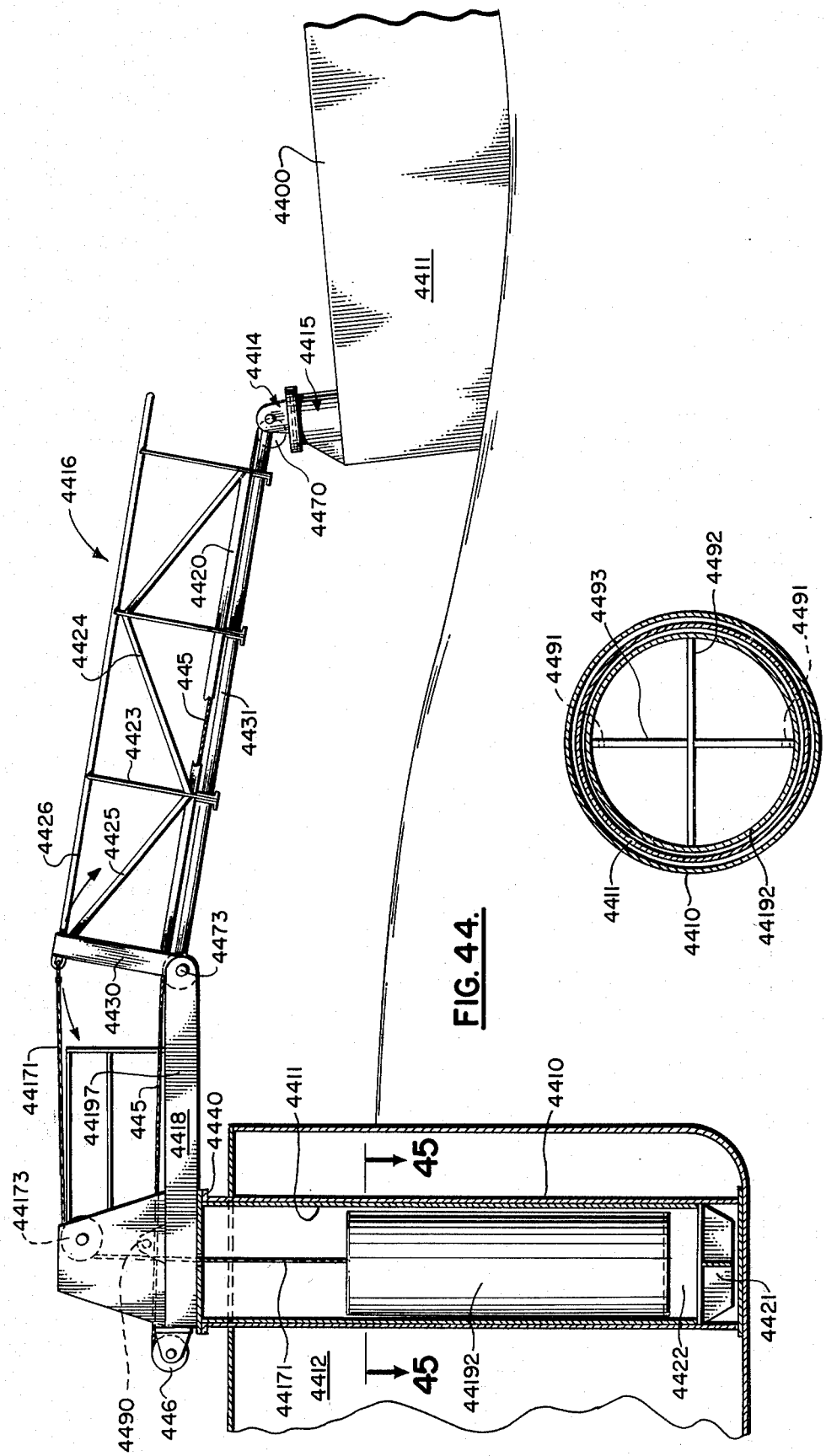

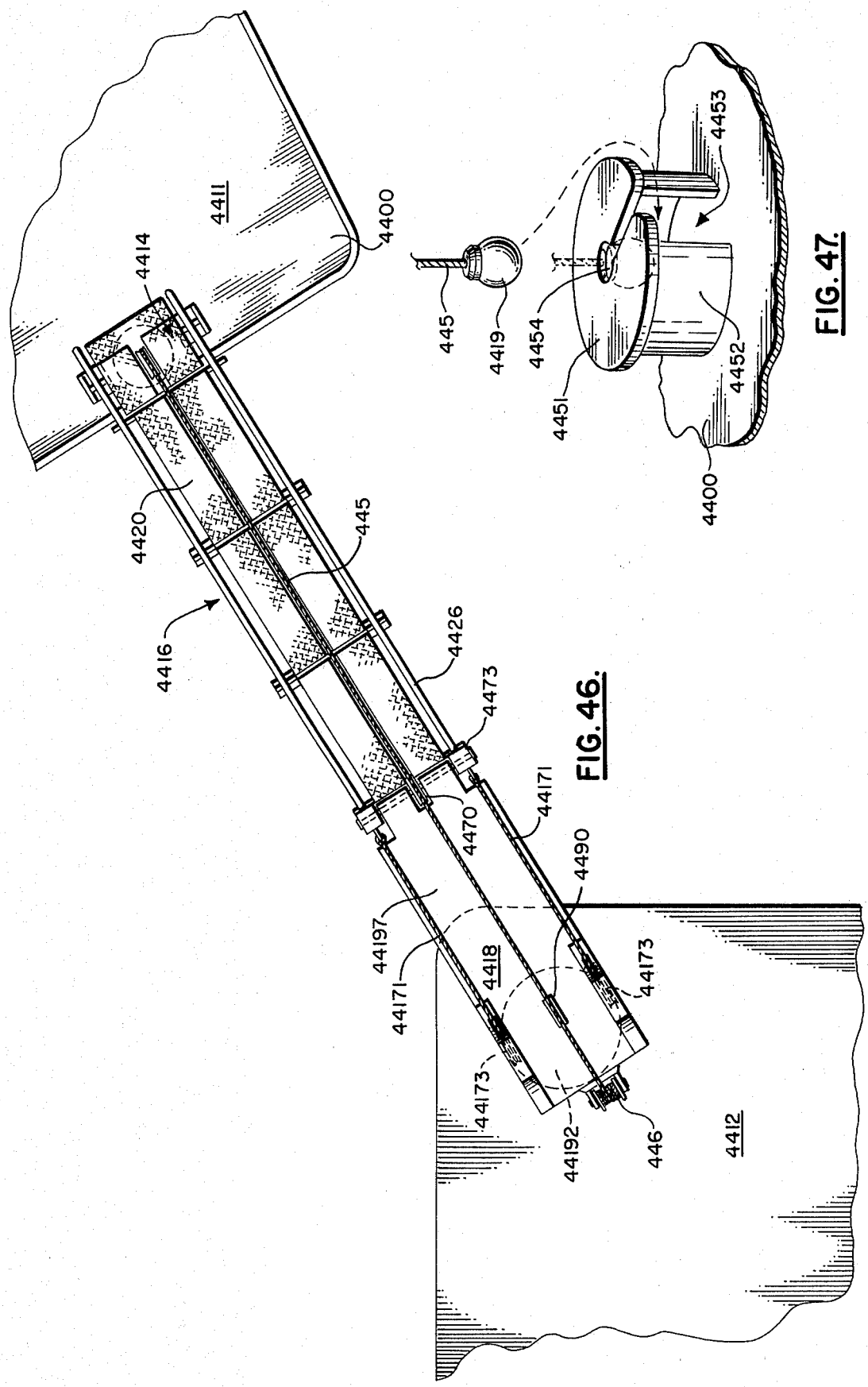

COMBINED MARINE RAMP TRANSFER AND MOORING SYSTEM

BACKGROUND OF THE INVENTION

1. FIELD OF THE INVENTION

The present invention relates to a combined marine ramp transfer and mooring system for transferring, for example, personnel and/or material between two moving objects or between a moving object and a stationary object such as, for example, a boat to another boat or barge, or a boat to a dock or platform, respectively, wherein the rising and falling of the moving object is accomodated by an appropriately long ramp that serves as a gradual transition which smooths out the relative vertical movement changes to a negotiable or acceptable amount throughout its length.

The present invention has been proven in the offshore marine industry in the transfer of personnel and/or material between a stationary object such as a platform and a moving object such as a boat wherein the platform connection aids in stabilizing the boat and in adapting to the movement of the boat in response to the swells of the waves and hence will be discussed in great detail with particular reference thereto and then in more general detail with respect to other marine embodiments.

2. Prior Art

One major problem facing the offshore industry today is the saft and efficient transfer of personnel and equipment between boats and platforms. As industry goes farther offshore, wave heights in the neighborhood of 6 to 8 feet are relatively commonplace and can get to be much higher. The higher waves encountered frequently lead to delays, lost equipment dropped over the side and, in some instances, accidents. Additionally, high winds can become a negative factor. For example, out in the North Sea one can expect to be confronted with a wind blowing at 20 knots with 15-foot waves.

Several types of structures to permit transfers of personnel or cargo from two relatively moving objects, such as for example ships to other ships, or to stable objects such as for example platforms, have been known and used before in the prior art. Typical examples thereof in the moving boat to stable platform transfer art, which are actually and presently being used in the offshore marine industry, are — a "monkey rope" system which is a rope hung from the stable platform wherein a man grabs the rope from the moving boat deck and swings to the platform; and a personnel basket system which is a rope-tied basket suspended from a cable and lowered by a service derrick located on the stable platform to transfer men and equipment from the platform to the deck of a moving boat or from the deck of a moving boat to the platform wherein the personnel hold on to the basket and are lifted to the structure by the crane; and finally a helicopter which permits the transfer through air borne means between usually a land base to the stable platform. However, these actually used methods of the prior art either require considerable timing and dexterity on the part of the human operator to grasp for example the monkey rope when the boat deck is at the highest point of the swell and to be able to support his own weight and swing himself to the receiving deck and drop to safety there; or on the part of the crane operator in maneuvering the basket by his dexterity and ability, as well as an expensive crane structure and training that the crane operator must go through in order to safely transport people as well as the additional risk with human intervention of accidents occurring; or expensive equipment such as a helicopter which cannot operate during heavy weather; respectively.

Several types of direct attachment or ramp-type devices have also been known and used in the prior art to transfer cargo and personnel between ships or from ships to fixed platforms, and typical examples thereof in the marine transfer art are U.S. Pat. No. 3,064,829 issued Nov. 20, 1962 to Winfrey et al; U.S. Pat. No. 3,245,101 issued Apr. 12, 1966 to R. E. Wilson; U.S. Pat. No. 3,426,719 issued Feb. 11, 1969 to L. Mizell; U.S. Pat. No. 2,617,131 issued Nov. 11, 1952 to F. R. Harris; U.S. Pat. No. 3,228,051 issued Jan. 11, 1966 to Voase; U.S. Pat. No. 3,008,158 issued Nov. 14, 1961 to P. L. Stinson; U.S. Pat. No. 2,372,574 issued Mar. 27, 1945 to Haynes; U.S. Pat. No. 2,876,919 issued Mar. 10, 1959 to True et al; U.S. Pat. No. 2,886,228 issued May 12, 1959 to Susikari; U.S. Pat. No. 3,095,848 issued July 2, 1963 to Dick; and U.S. Pat. No. 2,641,785 issued June 16, 1953 to Pitts et al. Other patents of some interest to the general subjects of the present invention are U.S. Pat. No. 3,067,716 issued Dec. 11, 1962 to Norlin, and U.S. Pat. No. 3,047,891 issued Aug. 7, 1962 to Golde et al. However, none of these patents disclose a relatively solid but flexible ramp which both structurally moves in direct proportion to the moving objects to which the ramp is attached for smooth transition and serves to moor or significantly stabilize the vessel, and still have the great torsional capabilities of the present invention with its gradual transition characteristics.

Thus, for example, all of the prior art patents cited above which are directed to ramp structures disclose ramps whose elements (sides and deck) are all fixed in their positions in relationship to each other in a lateral plane except for the Wilson patent discussed below, not allowing any twisting movement between the sides and the deck, and hence are not "flexible ramps" in the sense used in the present invention. The Wilson patent on the other hand is in a sense overly flexible, being merely a cantenary cable supported catwalk having a length which is variable during use, and hence is not at least a "relatively solid ramp" in the sense used in the present invention. Moreover, the Wilson device, like most of the other prior art patents cited above, has no substantial mooring capability as achieved in the present invention, and does not have a fixed separation distance between the ramp connections which is fixed with respect to each other and solid in the present invention, nor does it have a straight line ramp between the connections when in use as occurs in the present invention. These and further basic and secondary distinctions between the present invention and the prior art will be more fully appreciated from the discussion and description of the present invention presented hereinafter.

However, it should be appreciated at the out-set that the present invention has solved a long standing problem and is satisfying a long felt need, whose solution and satisfaction has eluded the prior art workers lo these many years. Moreover, it should be further appreciated that the present invention is not based on a mere paper disclosure but rather is based on actual and successful use in the field.

Present Invention

In contrast to the prior art actually used in the offshore industry, which is incapable of safe, efficient, reliable, and inexpensive transfer of personnel and equipment from boats and platforms, the present invention in its most preferred embodiment utilizes a unique ramp design which by means of its structure and attachment between the boat and the platform offers a more stable surface to walk on, although the surface is designed specifically not to remain laterally level but to slope in direct proportion to the moving objects to which it is attached, while maintaining the handrails in a vertical position with a constant orientation with respect to the deck, while providing additional stability to the boat deck surface by reducing roll. The present invention, while utilizing a single ramp to transport personnel from a moving object to another moving object or to a stable object, reduces the vast difference in movement through the flexible ramp in a directly proportional transition between the two objects.

The proven system of the present invention includes a flexible ramp with guard rails that attach the vessel to the fixed structure. The ramp moves with the motion of the boat, even twisting as the boat rolls. No torsion is experienced in any of the structural members during the operation. One important aspect of the present invention is that anyone using the ramp to transfer between boat and platform is naturally accustomed to all movement changes through a gradual, rhythmatic transition with each increment of movement to his destination. There is no abrupt change in motion or impact which could cause loss of balance.

In the most preferred embodiment of the present invention, this gradual transition is produced by a ramp structure formed by two stringer members carrying a deck structure between them with two vertical sides forming handrails having the following features:

1. The inboard end of the flexible ramp is attached to a horizontally stable pivot deck on the platform by a horizontal hinge pin which allows vertical movement. Therefore, when one steps aboard the ramp from the pivot deck, the vertical movements are so slight that it is hardly noticeable.

2. Even though each of the stringer members, which forms the bottom chord of the side trusses, are connected to the same horizontal hinge pin, they may move independently of each other through their respective longitudinal arcs. It is this independent movement that allows the deck to conform to the exact slope of the rolling boat deck at the outboard end of the flexible ramp. Since the deck beams actually pivot about the stringer members independently of each other, the slope of each individual deck beam will be in direct proportion in accordance with its position on the stringers, from a maximum slope on the outboard end to a horizontal position on the inboard end. Therefore, the movement of the ramp will vary from a point of relative stability at the pivot deck to a point of maximum activity where it attaches to the boat through a directly proportional relationship.

3. The inboard, platform end of the flexible ramp through the pivot deck is able to rotate about its platform connection, while the outboard, boat end of the ramp is connected to the boat by means of a swivel connection which allows rotation about an axis vertical to the plane of the boat and by means of a horizontal pin connection which allows hinged movement about an axis parallel to the plane of the boat.

4. The ramp maintains a constant, straight length between the hinge point where it attaches to the pivot deck on the platform and the hinge point where it attaches to the boat. The boat will move vertically and horizontally through a constant radius, and the ramp is capable of absorbing all the tension and compression produced by the boat, and transmits these forces to the platform.

5. Since the ramp attaching pedestal on the boat is preferably located on the center line of the boat, transverse activity is minimal at this point as compared to a point near the outboard side of the boat.

6. The activity of the ramp will never exceed the moving activity of the boat. Actually, when one steps on the ramp from the boat deck, the moving activity is identical, and will decrease proportionally as he walks toward the pivot deck.

7. A feeling of security is also lent to the transferee by the handrails which remain vertical during the operation. A person will assume a vertical position while walking on a rolling deck, therefore, there is a constant orientation between the handrails and the person. Also the distance from the handrails to the ramp deck remains constant.

8. A person will become accustomed to movement changes with each step he takes. He decides how fast he will move in accordance with his ability to adapt. His body will be subjected to all the oscillatory changes through this gradual transition.

Attachment of the boat to the structure in the present invention is accomplished without outside assistance from anyone that is not on the boat. Because no one need be on the platform to assist with docking, this is especially important for unmanned or abandoned platforms.

Once moored to the platform by the unique attachment means of the present invention, the boat is significantly stabilized, thereby increasing the safety factor during the time it is necessary for men to walk on the boat's deck. It is noted that the most agressive movements of a boat involves it transverse or rolling activity. The flexible ramp of the present invention is designed to conform to these transverse movements over its length in a directly proportional manner. No torsion exists in any of its members during the operation. The force necessary to reorient the ramp structure times the vertical distance from the metacenter of the boat offers a significant resistance moment.

The ramp exerts a lift on the connecting boat pedestal which also offers resistance to roll.

The ability of the boat to weathervane about a point located on its end, as well as the ability of the ramp to rotate about a king post connection on to the platform tends to defuse the elements required for resonance build up necessary for excessive roll.

Another method of additionally reducing the rolling activity of the boat allowed by the present invention is by engaging the boat engines and pulling against the ramp.

It is the combination of these resistances which are created or allowed by the present invention that renders significant stability to the rolling activity of the boat and an enhanced mooring capability. Although the most preferred embodiment of the present invention has a total mooring and stabilizing capability, additional mooring or stabilizing means or lines of course can be used as desired.

A quick release means is also provided in the present invention to permit the boat to immediately and completely disengage from the platform.

Docking is accomplished at considerably distance from the fixed structure due to the length of the ramp, thereby decreasing the damage potential to the boat or structure from collision of the two. Additionally, because the docking means is uniquely designed for ease of operation, the system is useful even in smooth waters. Reaction of the structure due to wave movements is less than if the boat were tied to the structure by a mooring line.

Because of the unique design of the ramp system, providing gradual rolling and adaptation of the motion between the stable platform and the moving boat, anyone using the ramp need not possess any special physical dexterity, timing, confidence, strength or agility. The present invention thus allows older men who have valuable experience and training to work for a much longer time offshore.

The use of a ramp as part of the unique ramp system which is flexible and therefore adapts between the moving ship and the stationary platform permits the ramp to compensate for various sea conditions. In areas where waves are known to be much higher, longer ramps can be utilized to make the transition period, and therefore the gradual change in movement, longer for greater ease of adaptation.

The present invention also allows considerable time saving because of its unique and easy means of attachment between the moving ship and the stationary platform in even very rough seas. Therefore, shut in wells can be reactivated as soon as the boat can get to the location; whereas, presently, boats frequently get out to the platform and then have to wait several hours before they can transfer crew and cargo because of wave heights. Under the present invention, as long as the boat can make the trip to the platform, the crew will be able to disembark.

Furthermore, the attachment means on the boat that engages the platform uses a very small deck area, thereby permitting better utilization of the boat deck area.

Moreover, a standard deck winch is used to pull the boat and the ramp together for attachment. This winch is equipped so that it will pay out under excessive loads and continue to pull in after the excessive load has passed. This will prevent undue shock to the entire system.

Also, this winch system allows the boat operator to continue applying the winch, even after the attachment is complete, without fear of breaking anything. It is this freedom from precise decision on the part of the boat operator that makes this system safe and usable for all boat "skippers".

Moreover, the boat activity is that of pulling rather than slacking off further simplifying the judgments needed by the boat crew.

Additionally, because of the loose construction of the ramp means, the ramp means can maintain a constant length and be capable of twisting as the boat rolls or pitches without creating torsion in any of its structural members.

Moreover, because the ramp means is anchored both to the moving boat and to the stable platform, the ramp means, through its unique construction, has the ability to condition a human body from one situation of stability to a different situation of stability through a smooth transition without abrupt change in motion or significant impact experienced by the person using the system.

Also, the end movements of the ramp means, because they are securely fastened to the respective objects, are identical to the objects to which they are attached. Therefore, when a person steps aboard and disembarks from the ramp means, there is no noticeable change in movement detected by him.

In certain embodiments of the present invention counterweight dampening is used to smooth out motions of the boat and the ramp. Moreover, the counterweight dampening means cushions the impact when the counterweight strikes the bottom of its container, as well as reduces the speed of the ramp when it is returning to its quiescent position after it is released from the boat. This is accomplished through the use of counterweight means that are extremely simple, not involving any valves, fins, ports or other unreliable and expensive equipment. The counterweight dampening means displaces fluid and forces it between the outer diameter of itself and the inner diameter of its container to restrict the flow that causes the dampening.

It is noted that the ramp of the present invention can be used in all weather conditions and is only limited by the ability of the boat, to which the ramp is being connected, to operate. In order to not unnecessarily increase the costs of a particular ramp installation, however, the ramp will usually be designed to handle a given size boat in conditions under which that boat can operate safely. However, a ramp could be designed in accordance with the principles of the present invention to handle a battleship in a hurricane if cost factors were not a concern.

Therefore, at the center of the present invention, is a flexible ramp between a stationary and a moving object or a flexible ramp between two moving objects, so that personnel and/or material can be transported across it. It should be noted that the work "flexible" as used herein means that the structure of the ramp will be capable of movement in all directions — up, down, sideways and twist — and yet remain structurally sound and at least relatively solid. This solidity is achieved either by solid, fixed, structural members such as steel stringer pipes, or a relative solidity achieved by cables, ropes or other lines under sufficient tension so that they exhibit rigidity, even though in their nascent or natural state they are completely flexible. However, in such a rigid situation, the ramp will be relatively straight along its length when such sufficient tension is supplied, and not slump or be slack thereby following a curve along its length. Thus, included within the meaning of the word "solid" as used herein is a situation wherein sufficient tension is applied across a cable supported flexible ramp to make it taut and rigid. Such tension can be attained in such a ramp between a dock or platform and a boat by appropriately engaging the boat engine and using the boat's pulling capability in order to keep the ramp taut while supporting the weight being transported across it. Or in the case of a boat-to-boat system, wherein a "cable" type flexible ramp is attached to the stern of each boat, sufficient tension can be created by both boats pulling against each other in opposite directions.

Thus, in summary, a basic, over-all object of the present invention is to provide a flexible but relatively solid ramp between two relatively moving objects which will accustom a body to all movement changes through a gradual, rhythmic transition with each increment of movement to the destination.

Another object of the present invention is to provide a system of transferring personnel which will increase their feeling of security by a configuration of vertical handrails with a constant distance from handrails to the deck.

Another basic object of the present invention is to provide ramp means for mooring and stabilizing the moving activity of the object to which the ramp is attached.

Another object of the present invention is to provide a method of docking procedure in order to safely moor a moving object to the ramp.

Another object of the present invention is to provide a mooring system which will allow a safe and soft landing of a boat to the ramp even in rough sea conditions.

A final object is to provide other structural elements which can be used in the ramp system of the present invention and elsewhere which helps the over-all mooring and transfer system to be relatively safe, efficient, reliable and inexpensive.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and wherein:

FIG. 5 is a cross-sectional view of the preferred embodiment of the ramp system of the present invention along section lines 5—5 of FIG. 3.

FIG. 6 is a cross-sectional view of the preferred embodiment of the ramp system of the present invention taken along section line 6—6 of FIG. 3.

FIG. 7 is a cross-section view of the preferred embodiment of the ramp system of the present invention taken along section line 7—7 of FIG. 3.

FIG. 8A is an elevational side view of the preferred embodiment of the ramp system of the present invention showing the pin connection on the inboard end of the bottom cord of the handrail trusses known as the stringer members.

FIG. 8B is a top elevational or plan view of the preferred embodiment of the ramp system of the present invention showing the pin connection of the inboard end of the stringer members.

FIG. 9 is a side cross-sectional view of the preferred embodiment of the ramp system of the present invention taken along section line 9—9 of FIG. 3.

FIG. 10 is a side cross-sectional view of the preferred embodiment of the ramp system of the present invention taken along section line 10—10 of FIG. 3.

FIG. 11 is a plan view of the preferred embodiment of the ramp system of the present invention showing the boat connection assembly located on the outboard end of the flexible ramp at the boat.

FIG. 12 is an end view of the preferred embodiment of the ramp assembly of the present invention showing the boat connector assembly located on the outboard end of the flexible ramp.

FIG. 12A is an exploded detail of the preferred embodiment of the ramp system of the present invention indicating the placement relationship of the outboard end of the stringer members with respect to the welded rings and the swivel connector.

FIG. 13 is a side view of the preferred embodiment of the ramp system of the present invention showing the boat connection assembly located on the outboard end of the flexible ramp.

FIG. 14 is an end cross-sectional view of the preferred embodiment of the ramp system of the present invention taken along section line 14—14 of FIG. 11 indicating the beveled bottom of the latching members as they penetrate the inside area of the boat pedestal flange housing.

FIG. 15 is a top, partial, cross-sectional view taken along section line 15—15 of FIG. 12 of the preferred embodiment of the ramp system of the present invention showing the operation of latching members of the connection assembly.

FIG. 16 is a partial elevated view of the preferred embodiment of the ramp system of the present invention taken along section line 16—16 of FIG. 11 showing the vertical arrangement of the releasing levers.

FIG. 24 is a top view of the preferred embodiment of the ramp system of the present invention showing the structural arrangement of the pivot deck which rotates about the king post and is pin connected to the inboard end of the flexible ramp.

FIG. 25 is a side cross-sectional view of the preferred embodiment of the ramp system of the present invention taken along section lines 25—25 of FIG. 24.

FIG. 26 is a partial elevated view of the preferred embodiment of the ramp system of the present invention taken along section lines 26—26 of FIG. 24.

FIG. 27 is a partial elevated view of the preferred embodiment of the ramp system of the present invention showing the section of the king post and the inner race of the pivot deck bearing.

FIG. 28 is a top cross-sectional view of the preferred embodiment of the ramp system of the present invention taken along section lines 28—28 of FIG. 27 showing the pivot deck bearing inner race.

FIG. 29 is a partial elevated view of the preferred embodiment of the ramp system of the present invention showing the pivot deck bearing relationship to the total bearing assembly.

FIG. 39 is a side view of an alternate embodiment of the ramp system of the present invention showing another structural arrangement which involves a totally flexible ramp which is held out by a stay with a system of flexible lines and hand rail sections. Spreaders can rotate along the stay in a bushing arrangement in order to compensate for deck movement. It is necessary for the boat to pull away from the ramp in order to make it stiff enough to be walked across.

FIG. 40A & B are end cross-sectional views of the alternate embodiment of FIG. 39 of the present invention of the ramp system taken in the area of section lines 40—40 of FIG. 39, with FIG. 40B showing the ramp in the alignment it would have after being attached to a boat that had rolled to one side.

FIG. 41 is a side view of an alternate embodiment of the ramp system of the present invention wherein the ramp can rotate about a single caisson structure. An external couterweight is extended opposite of the ramp on the other side of the caisson and pivots vertically on the horizontal pin at the caisson.

FIG. 41A is a perspective view of the connecting structure of the embodiment of FIG. 41 showing how the ramp structure, the counterweight structure and the caisson are all connected together.

FIG. 44 is a side, partially cross-sectional view of an alternate embodiment of the ramp system of the present invention showing an arrangement suitable for barge transfer operations wherein no suitable structure for the mounting of a king post and swivel head connection is available.

FIG. 45 is a top cross-sectional view of the alternate embodiment of the ramp system of the present invention taken along section lines 45—45 of FIG. 44.

FIG. 46 is a top view of the alternate embodiment of FIG. 44 of the ramp system of the present invention.

FIG. 47 is a perspective view of the special docking pedestal on the boat for connecting the ramp to the boat for the embodiment of FIG. 44.

DETAILED DESCRIPTION OF THE PREFERRED EMBODIMENTS

Introduction

The ramp transfer and mooring system of the present invention can be used to transfer, for example, personnel and/or material from a moving object to a relatively stationary one, even when the relative movement is substantially great, wherein it is important that the transition from the motion of the moving object to the relatively stationary object be made in a smooth, nonabrupt manner and wherein the connection mechanism between the stationary and moving object is easy to engage and disengage with the moving object. A particularly important area of application of the present invention which has been proven in actual practice is the transfer of personnel and/or material between an offshore platform and a boat carrying the personnel to the offshore platform, and therefore the most preferred embodiment of the present invention will be described in great detail with respect to such an application and several alternate embodiments described with respect to other marine embodiments in more general detail. However, it should be realized that the present invention could be applied to, for example, many other applications where it is desired to transfer equipment, personnel, or other material between either a moving object and another moving object or a moving object and a stationary one wherein substantial relative movement between the two objects needs to be accommodated and gradualized, and the two objects are to be moored together.

Platform/Boat Embodiment: FIGS. 1-35

Figures 1, 2:
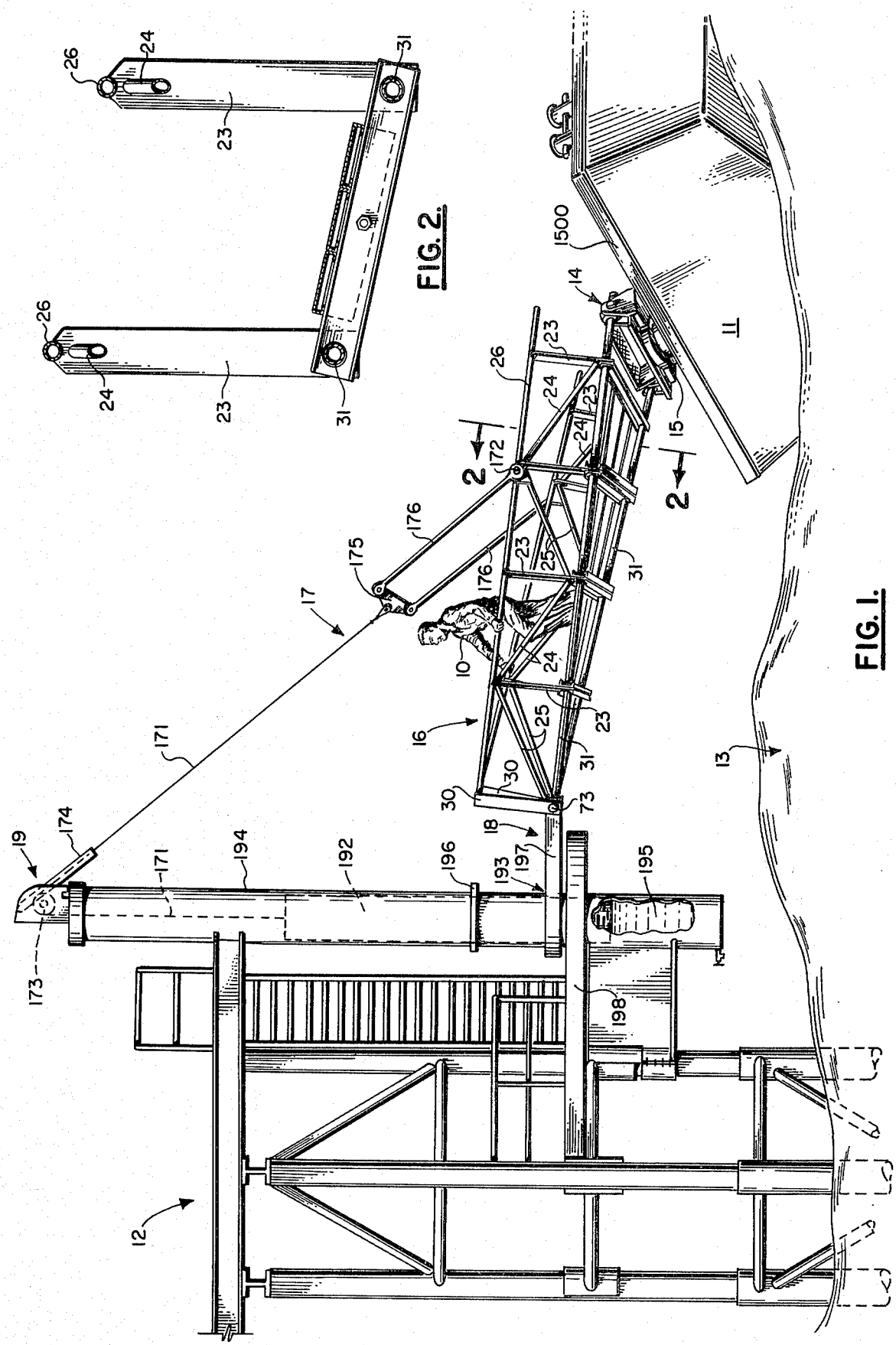
FIG. 1 is a generalized perspective view of the preferred embodiment of the system layout of the present invention of the ramp system showing an offshore platform structure and the stern of a boat being connected together by a flexible ramp which maintains a constant length and is capable of transverse movement in accordance with the transverse movement of the boat deck.
FIG. 2 is a cros-sectional view of the preferred embodiment of the ramp system of the present invention along section lines 2—2 of FIG. 1 indicating the parallelogram-type configuration assumed by the structures where the side truss handrails remain vertical while the deck is positioned on a bias which is directly proportional by distance from a horizontal position on the inboard platform side to the exact slope of the boat deck on the outboard end.

Referring to FIG. 1, there is shown a first embodiment of the transfer, mooring system of the present invention as it is used to transfer personnel 10 and/or material from a boat 11 by means of the ramp 16 to a stationary platform 12 at sea 13. It is noted that FIG. 1 is a generalized illustration not drawn to scale, and that of course the relative sizes of the platform 12, boat 11 and personnel 10 as illustrated should not be taken literally.

It is further noted that the ideal ramp arrangement for a fixed platform such as for example an offshore drilling rig involves the inclusion of two individual ramp structures located on diagonal corners of the platform deck. The corners selected should be in the direction in which the greatest percent of the sea will run. If only one ramp is used, it should be located on the corner which would be on the lee side of the platform, considering the greatest percentage of sea currents.

Ramp Structure

The flexible ramp 16 is designed to efficiently handle and transmit all forces from the boat 11 to the platform 12. This is done mainly through two opposed longitudinal stringer members 31 which serve as the sole tension members in that these are the only two members which transmit all the tension caused by the boat 11 pulling on the ramp. The stringers 31 form components of the bottom cord assemblies of the vertical trusses 23 (note FIG. 2), and as further illustrated in FIGS. 3 and 4, a side parallelogram structure is further formed by two opposed longitudinal top members 26, which form top cords with the vertical trusses 23 in which the stringers 31 forming the bottom cords are free to rotate. The vertical trusses or stanchions 23 always remain vertical (compare FIGS. 2 and 5) regardless of the relative vertical movement of the stringers 31. The top members 26 are fixedly attached to the vertical trusses 23 and move therewith.

The stringers 31 which can be made of heavy duty piping are preferrably welded only on the ends which minimizes the residual stress associated with welding and its undersirable effect on strength. Also, the undersirable moments involved in welded structural appendages associated with truss fabrication are eliminated.

The inboard or platform end of the stringers 31 are connected by hinge pins 73 which will be more fully discussed below. The outboard or boat ends of stringer members 31 are connected by connection means 14 which include rotatable fittings which allow stringer members 31 to rotate normal to the hinge pins in a vertical, longitudinal plane and allow the fittings to themselves rotate about the stringers 31 about their longitudinal axes. (This will also be discussed in more detail below.) Due to this arrangement, no significant torsion is transmitted to the stringer members 31 arising from the complex movement of the boat 11.

The stringer members 31 are tubular, which is the most efficient compression shape because of the constant radius of gyration. Also, because the concept of the flexible ramp 16 involves the necessity of other structural members to pivot about the stringers 31, the tubular shape is the most appropriate.

The stringer members 31 are kept within allowable limits with gyrations of the boat 11 by means of the associated vertical trusses 23, the combined diagonal strengthening members and guard rail 24 and 25, and top cord members 26, as well as transverse beam assemblies 27. This containment without welding fixity provides the high degree of structural efficiency and flexibility of the present invention.

The function of the vertical trusses 23 is to limit bending within an allowable limit of stringer members 31 as well as provide safe containment for the men and material during the transfer process. The top cord 26 is a tubular member which also serves as an efficient hand rail for the personnel 10. The diagonal guard members 24, 25 are also tubular members arranged to adequately support their function of force distribution within the truss as well as form a reasonable protection in containing the transferees 10.

The vertical stanchions 23 are flat bar members arranged with their major axes in a transverse or lateral manner which increases vertical stiffness and allows an economical attachment of stringers 31 by means of suitable holes. The vertical stanchions 23 are maintained in a given area on the bottom stringer members 31 by suitable stops on the stringer which limit their longitudinal movement.

Except for the terminal ones (not FIGS. 9 and 10), each transverse beam assembly 27, as illustrated in FIG. 6, is composed of a pair of beam members 40 and a T-member hold-down 60 having spacer section 61, with the beams 40 and hold-down member 60 secured together by bolts 62 and nuts 63 (note FIG. 6). The transverse beams 40 support the deck grating or panels 20 by means of the hold-downs 60 or at the ends by means of terminal hold-down plates 66, the latter being bolted to the terminal beams 40 by means of nuts 65 and bolts 64.

A channel shape for beams 40 is used because the beams 40 are fastened to the stringer 31 by means of suitable holes and this shape is most appropriate. Channel shape beam members 40 are also positioned back-to-back with section 61 between to give additional space 32 as a good compression arrangement (not FIG. 6). The channel shape is also used because the assembly lends to a simple arrangement for deck panel 20 fasteners, which allows each panel to float within a reasonable limit. The bolt hole in 61 is considerably larger than the bolt 62. Also there is ample clearance between the top section of member 60 and its engagement with the deck panels 20 which allows each panel to move independently of each other. It is this freedom of movement that prevents any significant torque from being transferred to adjacent deck panels 20.

The problem of racking in the transverse beams 40 is relatively insignificant because the stringer members 31 are connected by close tolerance fittings on the inboard end through hinge pins 73 and on the outboard, distal end by a swivel connector fitting described more fully below which are not subject to significant eccentric loading. The transverse beams 40 serve as lateral spacers between the stringer members 31 and limit their movement relative to each other in their separation distance but not in their relative alignment in a vertical, longitudinal plane.

Inboard hinge pin 73 hinges ramp 16 to pivot deck 197 and keeps the inboard ends 30 of the ramp 16 vertical while maintaining the vertical trusses 23 in the vertical position and alowing the vertical trusses 23 to move independently of each other through a given longitudinal arc (note relative positions of inboard end members 30 in FIG. 1). This independent movement also allows the deck 20 of ramp 16 to conform to the transverse movements of the boat deck 11 through a parallelogram configuration as shown in FIG. 2. Grease fitting 72 is used to permit the flow of grease between hinge pin 73 and connector member 75 connecting to stringer member 31.

It is noted that the fastening structures of the stringers 31 to the hinge pins 73 do not allow but rather prevent any rotation between the hinge pins 73 and the stringers 31 about their longitudinal axes. This is in contrast to the connections between the vertical stantions 23 and the lateral members 27 with the stringers 31 which do allow relative rotation about the longitudinal axes of the stringers 31.

Typical dimensions for a ramp structure of the foregoing design which have been proven in actual use are as follows:

approximate ramp length — 22 feet;
approximate ramp width — 41 inches; and
approximate ramp height — 4 feet.

As mentioned above, the desired length of the ramp depends on the amount of relative motion that needs to be accomodated, which is primarily dependent on the wave heights to be encountered. A rough "rule of thumb" that has been developed in the present invention is that the length should have a ratio of approximately two-to-one in comparison to the expected maximum wave height, and approximately six and a half-to-one in comparison to ramp width and height..

Pipe stringers 31 having an outer diameter of four-and-a-half inches riding in holes in the members 23, 40 having a diameter of 4⅝ inches has also been proven suitable.

As can be appreciated by the description of the ramp structure in the foregoing and supplemented by the additional description below, the ramp structure of the preferred embodiment of the present invention is flexible in a lateral or transverse plane but solid and straight in line along its length with no articulation and is capable of accomodating all the movements of the boat, even twisting as the boat rolls or pitches, without any significant torsion being experienced in any of its members, the ramp maintains a constant length between its hinge points where it attaches to the moving objects through its stringers, and maintains the boat connection at a fixed distance, allowing it to move horizontally and vertically through a constant radius. The ramp is capable of absorbing all the tension and compression produced by the boat and transmits these forces to the platform only through the stringers.

Boat Connection Means

The boat attacher 14 (illustrated in detail in FIGS. 11–16) is a device that attaches the flexible ramp 16 to the docking pedestal 15 (illustrated in detail in FIGS. 17–20), the latter of which is welded onto the boat deck 1500. The boat attacher 14 utilizes a large diameter cylindrical section 1401 which is pulled down to fit over and around the docking pedestal 15 (note FIG. 19) and is latched thereto by a spring loaded sytem (described more fully below), whereby the attacher deck 1,400 is positioned over the top surface of the dock pedestal flange 1501 and the attacher cylindrical section 1,401 rides against the vertical circumference of the flange 1,501. This arrangement allows all the necessary lateral movement between the docking pedestal 15 and boat attacher 14.

The transfer, mooring system of the present invention thus utilizes a relatively large circumference of surface 1,501 of the docking pedestal 15 to transmit the primary horizontal forces to the flexible ramp 16. Unit stress is greatly reduced by this large area. The secondary vertical forces are also distributed over a relatively large underside area of surface 1,501.

The attacher assembly of boat attacher 14 thus uses a heavy wall, large diameter pipe 1,401 (note FIG. 15) to accept the horizontal forces from the pedestal flange 1501 and then transmits these forces through a suitably stiffened deck 1400 and then to vertically mounted padeyes 1,416. Although the padeyes 1,416 create a moment, this arrangement was chosen to limit the height of the boat pedestal 15 but still allow adequate clearance when the ramp 16 conforms to a downward position. The pins 3,104 of the swivel connectors 3,101 for stringers 31 are connected through the padeyes 1416.

As illustrated in FIG. 12A, each stringer 31 is connected to and inserted within the swivel connector 3101 by means of a close fitting aperture therein, with the weld rings 3102 and 3103 preventing any relative movement in the longitudinal directions wherein each swivel connector 3101 is allowed to rotate about its respective stringer member 31 about the longitudinal axis of the stringer member 31, in like manner as the vertical stanchions 23 and the lateral members 27, as described above. This rotatable but close fitting, connection is very important as it makes any racking in the transverse members 27 relatively insignificant because the close tolerance fittings are not subject to significant eccentric loading.

The attacher assembly 14 allows movement in all directions. Vertical movement is permitted by the pins 3104 in the stringer swivel connectors 3101. Transverse movements are permitted by the ability of the swivel connectors 3,101 to rotate about the stringers 31 with weld rings 3,102 and 3,103. Movement is permitted laterally by the ability of the attacher assembly 14 to rotate about the boat pedestal 15.

The latching mechanism which keeps the boat attaching assembly 14 fastened to the boat docking pedestal 15 operates on the sliding wedge principle, as does a door latch, using opposed wedge bars 1,403 fitted within slots 1,417 in the attacher pipe section 1,401 as illustrated in FIG. 14. The two flat bars 1,403 are pinned by bolts 1411, 1412 on the inboard side (side closest to ramp 16) to the attacher deck 1,400. They are fitted into the elongated slots 1417 (noted FIGS. 12 and 14) located on both sides of the pipe section 1401 to bear toward the pedestal pipe section 1,502. These latching members 1,403 are shaped with a curved indentation (note FIGS. 11 and 15) so that they will engage the underside of the pedestal flange plate 1501 for a suitable distance. The bottom edges of latching members 1403 are beveled (note FIG. 14) so that when they contact the pedestal flange top 1,501, the latching bars 1,403 are forced outboard, pivoting on bolts 1,411, 1,412, allowing the boat attacher assembly 14 to continue through until its deck surface 1400 contacts the deck of the flange member 1,501 of the docking pedestal 15. The spring 1,408 located on the outboard end of the latching bars 1,403 will return the latching bars 1,403 under the pedestal flange top 1,501 of the docking pedestal 15 for a completed latch up.

For disengaging the boat 11 from the boat attacher 14, releasing levers 1,404 and 1,405 are provided to push the latching bars 1,403 apart by lugs 1,409 and 1,410, as shown in FIG. 15, thereby extending the locking bars 1,403 out beyond the distance of pedestal flange top 1,501. As indicated by the arrows in FIG. 15, the releasing levers 1,404 and 1,405 are rotated about the pivot bolts 1,413 and 1,414, respectively, by means of a workman pulling on vertical handles 1,406 and 1,407 respectively. This allows the counterweight 192 (as explained more fully below) to lift the ramp 16 off the boat docking pedestal 15, and the boat 11 is disengaged from the ramp system. After the boat attacher 14 is disconnected from the docking pedestal 15, the spring 1,408 will pull the releasing levers and locking bars back into their biased position (illustrated in FIG. 11) until the attacher is used again.

It is noted that one end of each releasing lever 1404 and 1,405 is pinned by bolts 1,413 and 1,414, respectively, to attacher deck 1,400 which allows pulling of the free end by the handle 1,406 and 1,407, respectively, in a radial motion. Because there is considerable mechanical advantage involved in the lever action, only a small amount of force is required to operate them. A line (not illustrated) attached to handles 1,406 and 1,407 would allow quick disconnected from any place on the boat deck 1,500.

Figure 17:
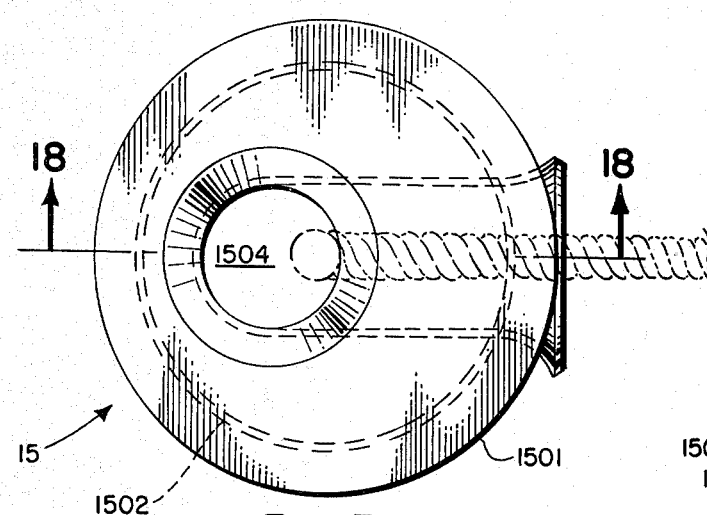
FIG. 17 is a plan view of the preferred embodiment of the ramp system of the present invention showing the boat docking pedestal which is the fitting which is attached to the boat and allows attachment between the boat and the flexible ramp.
Figure 18:
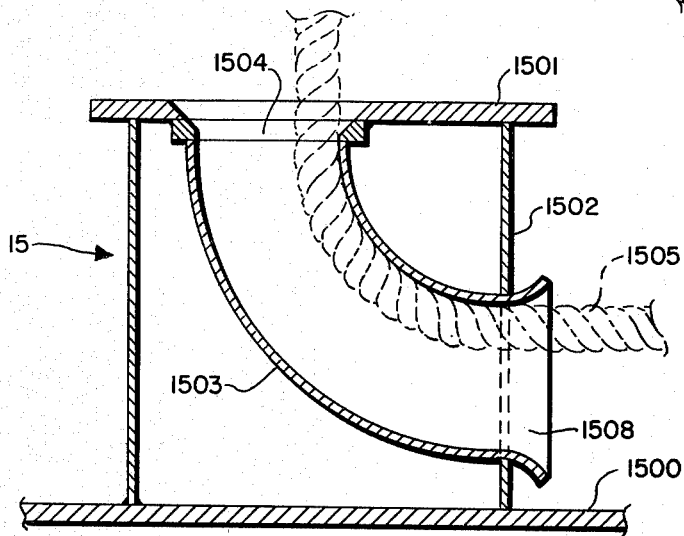
FIG. 18 is a side cross-sectional view of the preferred embodiment of the ramp system of the present invention taken along section line 18—18 of FIG. 17 showing the attaching line connection.
Figure 20:
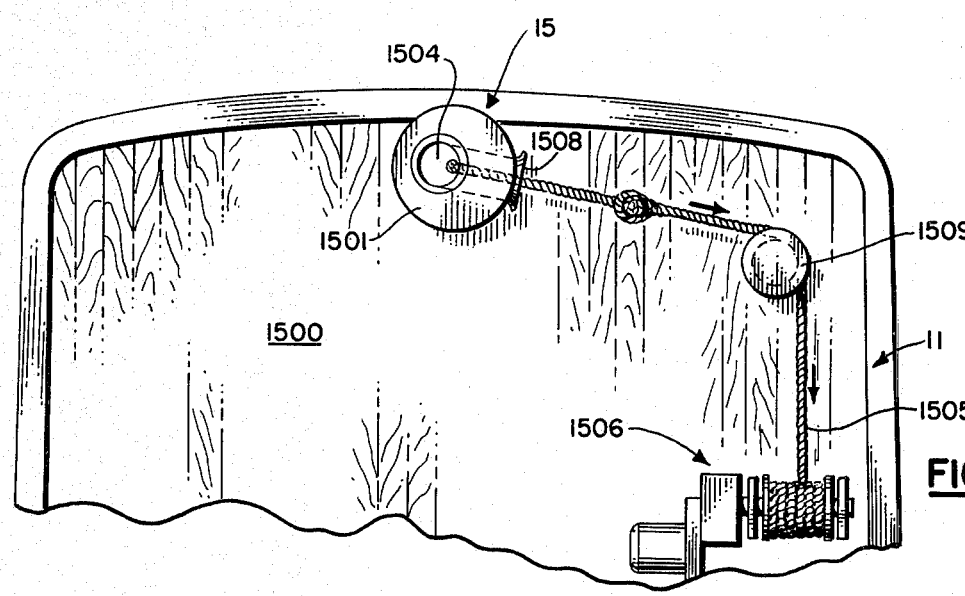
FIG. 20 is a partial, plan view of the preferred embodiment of the ramp system of the present invention showing the stern of the boat and the arrangement of the boat docking pedestal, deck button and mooring winch.

As illustrated in FIGS. 17 and 18, the boat pedestal 15 includes a round flange plate 1,501 welded to the top of a pipe section 1,502. The flange plate 1,501 extends beyond the outside diameter of the pipe 1,502 in order that the latching bars 1,403 of the boat attaching assembly 14 can engage under the flange 1,501. Another element of the boat docking pedestal 15 involves a long radius weld ell 1,503 which welded to the underside of the flange plate 1,501, with a suitable hole 1,504 cut in the flange plate 1,501 of the same diameter as the inside diameter of the ell 1,503. This hole is positioned eccentrically with respect to the center of the flange plate 1,501. The exact position of the ell is a function of the diameter of the hang line and the inside radius of the weld ell 1,503. The inside minimal radius of the ell 1,503 is positioned a distance equal to one-half the diameter of the hang line 1,418 (note FIG. 19) from the center of the flange plate 1,501. This will allow the center of the hang line 1,418 to coincide with the center of the flange plate 1,501 when the winch 1,506 is pulling on the hang line 1,418 by means of pull line 1,505.

As noted above, the size of the weld ell 1,503 is determined by the size of the hange line 1,418. The inside diameter of the ell 1,503 is large enough to accomodate the free movement of the hang line knot 1,419 while it is attached to the eye or loop 1,507 on the end of the winch line 1,505.

The bottom or end 1,508 of the weld ell 1,503 extends beyond the outside diameter of the pipe pedestal section 1,502. The end 1,508 of the ell fabrication is belled to prevent chafing of the winch line 1,505 or hang line 1,418. The flange plate and well ell opening 1,504 are also beveled to decrease hang line and pull line chafing.

The docking pedestal 15 is positioned on the boat deck 1,500 so that the bottom 1,508 of the ell 1,503 will accept the winch line 1,505 directly in line as it comes from the winch 1,506. In most instances, it is usually desirable for the pedestal 15 to be positioned so that the bottom 1,508 of the ell 1,503 will accept the winch line 1,505 after it has been diverted around a line guide 1,509. This usually lends to better utilization of the boat deck area.

Although the boat attacher 14 and pedestal 15 have been found to be most satisfactory in use, many other connection means in general or other forms of latches are possible.

It is noted that, in practically all circumstances, it is desirable to reinforce the boat structure in order to accomodate the forces which are placed on the docking pedestal 15 when connected to the ramp 16.

Method of Boat/Ramp Attachment

The deck winch 1,506 is provided to pull boat 11 and the ramp 16 together for attachment. The winch 1,506 is equipped so that it will pay out under excessive loads and continue to pull in after the excessive load has passed. This will prevent undue shock to the entire system. Another advantage of this type of winch arrangement is that it allows the boat operator to continue applying the winch, even after attachment is complete, without fear of breaking anything.

Figure 19:
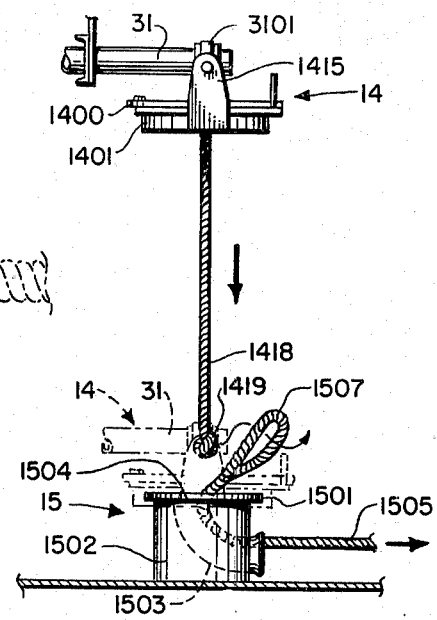
FIG. 19 is a side elevation view of the preferred embodiment of the ramp system of the present invention which shows the outboard end of the flexible ramp with the hang line and its association with the boat docking pedestal including one method of attaching the hang line to the winch line.

As illustrated in FIG. 19 a hang line 1,418 is attached in the center of the boat attacher assembly 14 located on the outboard end of the flexible ramp 16. A short section of chain (not illustrated) may be used at the point where the hang line 1,418 is fastened to the boat attacher assembly 14 to prevent excessive shear and chafing of the hang line. The hang line extends down approximately to water level (with the ramp in the up position). There is a knot 1,419 on the bottom end of the hang line 1,418, and this simple knot is the main initial element for attaching the hang line 1,418 to the winch line 1,506.

Attachment of the hang line 1,418 to the winch line 1,505 is accomplished by a deck hand passing the knot 1,419 on the end of the hang line 1,418 through an eye or loop 1,507 spliced on the end of the winch line 1,505 (note FIG. 19). Because the line 1,505 is preferrably of nylon so as to be extremely pliable, it will tend to squeeze the hang line 1,418 by the force caused by its own weight. The boat 11 is propelled forward, pulling the two lines taut, greatly increasing the squeezing activity, while the knot 1,419 on the hang line 1,418 prevents the eye 1,507 from slipping off.

With the boat still pulling slightly, the winch 1,506 is engaged to pull the ramp attacher 14 and the docking pedestal 15 together for a soft landing.

After the winch 1,506 has pulled the attacher assembly 14 unto the docking pedestal 15 to automatically latch them together by means of the locking assembly described above, the hang line 1,418 is released from the winch line 1,505. This is done by merely taking the knot 1,419 out of the eye 1,507 because the lines are slack as a result of letting off on the winch 1,506, after connecting the attacher assembly 14 to the boat pedestal 15.

Thus, in step-by-step format and in further detail, the method of attaching the ramp 16 to the boat 11 in the present invention, with particular reference to FIG. 19, is as follows:

1. The eye 1,507 spliced in the end of the winch line 1,505 is passed through the bottom opening of the ell 1,503, which is welded into the boat docking pedestal, and is pulled out of the top aperture 1,504 of the assembly for a reasonable length.

2. The boat is maneuvered so that the deck hand may get the hang line 1,418 that extends down from the outboard end of the ramp 16.

3. The deck hand passes the knot 1,419 on the hang line 1,418 through the eye 1,507 spliced in the end of the winch line (note curved arrow in FIG. 19), and then he squeezes the eye around the hang line and releases all lines.

4. The boat engines are engaged so that the hang line 1,418 and the attached winch line 1,505 become taut. This condition of line tautness is maintained by minimal thrust from the boat engines during the entire attaching procedure.

5. When the winch 1,506 is engaged, it overcomes the thrust of the boat engines, the forces of the wind and sea, and the force of the counterweight 192 which serves to lift and counterbalance the ramp 16. The boat 11 and ramp 16 are brought together by the winch 1,506, and attachment is automatic through the latching system described above.

6. The deck hand checks to see if the attachment is correct, then releases the hang line 1,418 from the winch line 1,506.

Release, when it is desired, is accomplished by pulling the release levers 1,404 and 1,405 by hand, or by a line which will allow release from anywhere on the boat deck. After releasing, the counterbalance 192 will return the ramp to an upward position, while the hang line 1,418 will follow through the boat docking pedestal 15.

It is noted that attaching a free-moving boat to a connected structure does not itself have any significant cushioning ability is a most critical consideration in the method of attachment of the present invention as the forces incurred could be excessive. The attaching technique of the present invention minimizes these forces to a tolerable degree by utilizing the following:

a. the hang line 1,418 attached to the end of the ramp 16 is capable of cushioning by stretching;

b. the winch line 1,505 on the boat is also capable of cushioning by stretching;

c. the counterbalance 192 which lifts the ramp 16 has a cushioning effect;

d. the winch on the boat is equipped to pay out under excessive loads, such as may occur when a boat is sliding down a large swell;

e. the boat skipper maintains a minimal constant pull on the attaching lines 1,418/1,505 in order to minimize acceleration and impact experieced from the unrestrained movements of a free boat; and f. in operation, the winch 1,506 will ultimately overcome the force of the boat engines and the lift of the counterbalance and allow a soft landing of the ramp 16 as it attaches to the pedestal 15 on the boat deck 1,500. As a further safety factor, the attaching lines 1,418/1,505 are designed to break under loads that are greater than those designed for the overall system.

Ramp/Platform Connections

As illustrated in FIG. 1, the ramp 16 is connected to the platform 12 by means of a counterbalanced ramp lift system 17 and also a pivot deck arrangement 18.

The ramp lift system 17 is attached to the ramp 16 by means of spreader sling 175 attached through opposed arms 176 to hinge pins 172 fixed to the side trusses formed by structural members 23, 25 and 26 of the ramp 16. The ramp lift system is counterbalanced by means of a heavy counterweight 192 suspended for vertical movement by cable line 171 in the hollow king post 194. Included within the king post 194 is a dampening fluid 195 which flows up between the counterweight 192 and the king post 194, so that the over-all combination work like a large shock absorber.

Figure 21:
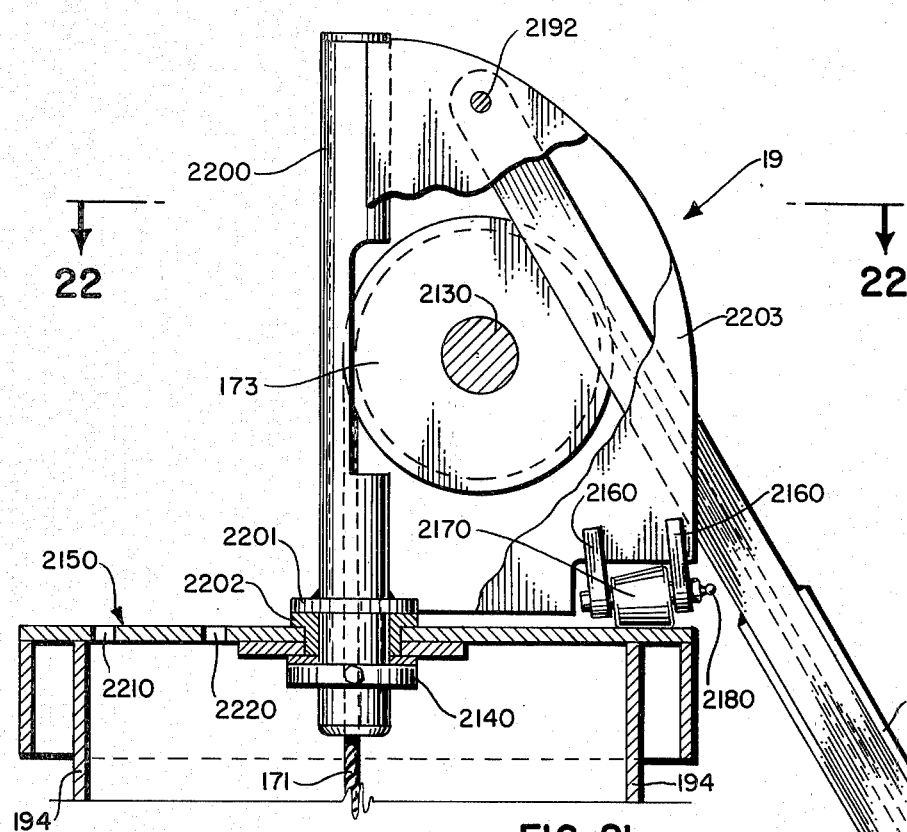
FIG. 21 is a partially elevated cross-sectional view of the preferred embodiment of the ramp system of the present invention showing the swivel head positioned at the top of the king post which conducts the lift line from the flexible ramp to the counterweight inside the king post.
Figure 22:
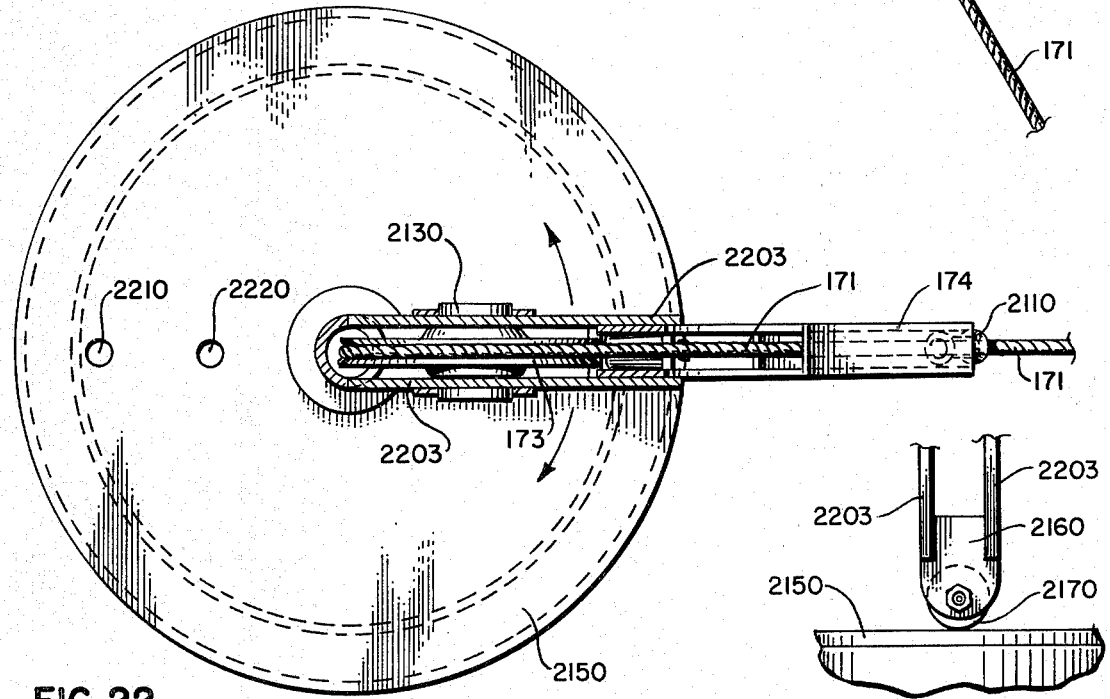
FIG. 22 is a plan, partially section view of the preferred embodiment of the ramp system of the present invention taken along section lines 22—22 of FIG. 21.
Figure 23:
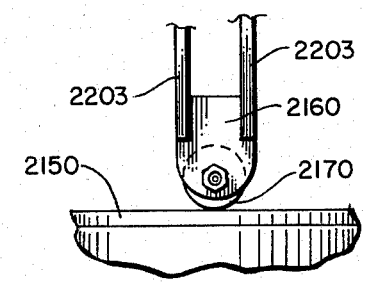
FIG. 23 is an elevated, partial, end view of the preferred embodiment of the ramp system of the present invention showing the tapered roller located on the bottom outboard end of the swivel head.
Figure 30:
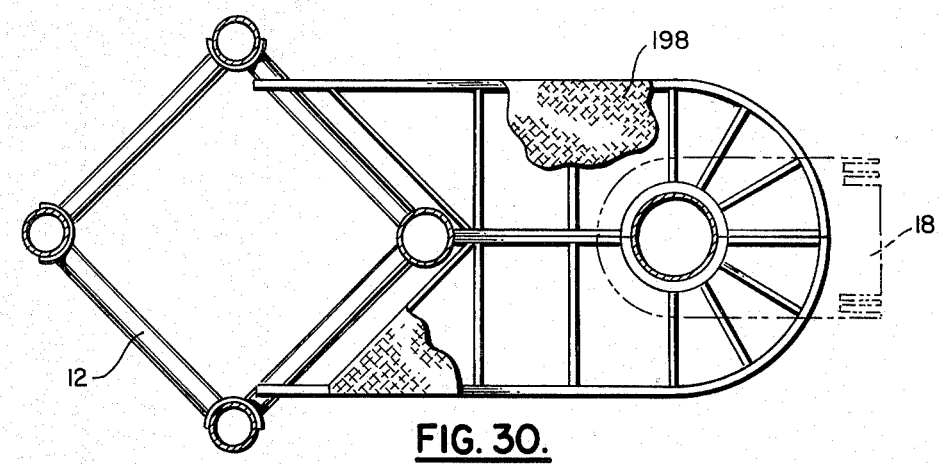
FIG. 30 is a plan view of the preferred embodiment of the ramp system of the present invention showing the access deck and its arrangement with the pivot deck assembly and the king post.
Figure 31:
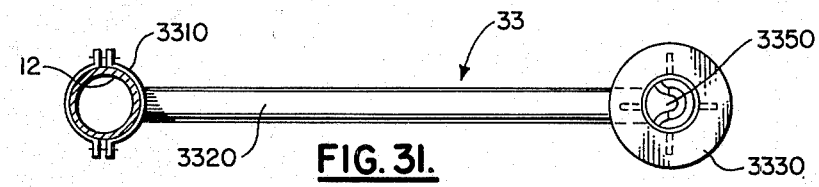
FIG. 31 is a plan view of the preferred embodiment of the ramp system of the present invention which shows the structure that enables the ramp to be tied back into the platform structure in anticipation of a storm. Both ends are secured to the platform so there will be no loose ends in bad weather conditions. In this view the flange of the fitting on the outboard end is the same as the flange of the boat docking pedestal. By dropping the hang line through the center of the tie back flange, the boat will be allowed to pull the two together and attachment is automatic as with a boat.

The cable line 171 is threaded through lever arm 174 and over sheave 173 housed in a swivel head assembly 19, the details of which are illustrated in FIGS. 21-23.

The swivel head assembly 19 performs the function of guiding the lift line 171 from the counterweight 192 to the lift spreader assembly 175, 176 of the ramp 16. It rotates about the center axis of the king post 194 by means of a hollow shaft 2200 which serves as an axis of rotation as well as allowing the lift line 171 to be conducted into the center of the king post 194. Flange 2,201 serves as a thrust bearing against bushing 2,202 which is housed in the king post cap 2,150. A keeper means 2,140 retains the rotatable swivel head assembly 19 on the king post cap 2,150. The sheave 172 is located between the cheek plates 2,203 by means of a pin 2,130.

The outboard force in the lift line 171 is directed into the end of the king post by a tapered roller 2,170 supported by brackets 2,160 welded to cheek plates 2,203. A grease fitting 2,180 is provided to lubricate the tapered roller 2,170. It is noted that the main bearing surface of the tapered roller bearing 2,170 is located above where the king post walls will be located so that it ultimately bears the force thereof.

The torque lever 174 is attached to the cheek plates 2,203 by a pin 2,192. It is equipped with a guide means 2,110 at its end which will exert additional torque from the lift line 171 to the swivel head assembly 19 in order that it will be positioned with the lateral movements of the ramp 16.

The king post cap 2,150 is designed to be lifted off of the king post 194 for easy access to the cable connection on the counterweight 192 when it becomes necessary for the cable 191 to be replaced. The forces caused by the weight of the counterbalance 192 and the weight of the ramp 16 are transmitted through the connecting line 171 riding over the swivel head sheave 173. These forces will securely maintain the swivel head assembly cap 2,150 on the top of the king post 194 without additional attachment.

Because the counterweight 192 can exert a significant impact on the bottom plate of king post 194 when the ramp 16 is released from the boat 11, dampening fluid 195 as noted above is added between the counterweight 194 and the bottom of the king post chamber to cushion this impact. Fluid can be added through two plug holes 2,210 and 2,220 (note FIG. 22) on the inboard deck section of the swivel head cap 2,150. In this manner adjustment can be made on site to obtain optimum operation of counterweight 192.

The counterweight 192 located inside the king post 194 of the ramp 16 is a weighted cylinder with a flat bottom, which is completely closed and maintains a constant seal except for the top which may be open or closed. The king post 194 is also sealed off at the bottom by a water-tight flat plate. Therefore, the dampening fluid 195 which is displaced between the inside of the king post 194 and the outside of the counterweight 192 will resist movement of the counterweight inside the king post. This is important, because it cushions the impact when the counterweight 192 strikes the bottom of the king post 194. Also, it reduces the speed of the ramp 16 while it is returning to the "up" position, after it is released from the boat 11.

The method of the present invention of decelerating the movement of the counterbalance 192 is extremely simple and does not involve any valves, fins, or parts. The flat bottom of the counterweight displaces the fluid and forces it up between the inside diameter of the king post 194 and the outside diameter of the counterweight 192.

As shown in FIG. 1, the inboard end of the flexible ramp 16 is attached to the platform 12 by means of a pivot deck 18, illustrated in detail in FIGS. 24–26, which pivots about the king post 194. As illustrated in FIGS. 27–29, the king post 194 includes an inner race bearing 193 for such pivoting.

The bearing 193 (note FIG. 29) which allows the ramp 16 to pivot around the king post 194 through the pivot deck 18 is located in an area that is constantly subjected to salt water spray and is designed for these conditions. It is necessary and desirable to provide a certain amount of rotational resistance to ramp 16 in order that it will not move freely in weather conditions while the boat 11 is not attached. However, it must be free enough to cooperate satisfactorily while it is attached to the boat 11 to permit ramp 16 to rotate about king post 194. Grease fittings 2,550 are supplied about every 15° in the areas of bearings contact so that inner race bearing members 2,430 cooperate slidingly with members 2,530 of the outer race. The secondary vertical load is handled by the top lip 2,560 of the outer race bearing against the top face 2,410 of the inner race which is welded to the king post 194. The primary radial loads are accommodated by the vertical faces of the circular rings 2,410 of the inner bearing race, which are welded to the king post 197, as they contact the outer race 2,530 of the pivot deck 197.

Therefore, with the ramp 16 connected through hinge pin holes 2,610 in pin holder assemblies 2,420 using hinge pins 73, force is exerted horizontally to king post 194 by bearing members 2,530 bearing against the king post surface members 2,410 and 2,430, while still permitting rotation of pivot deck 18 and its platform 197 about the king post 194. Platform 197 is supported at its outboard end by structural members 2,540. Verticalmembers 2,570 permit lifting the inner race from the outer race to inspect for damage.

Vertical members 2,570 permit lifting the inner race from the outer race to inspect for damage. The bearing 193 is designed so that the outer race (the entire pivot deck fabrication) can be lifted vertically by means of a "come-a-long" so that the bearing surfaces can be easily inspected and packed with grease. The ramp remains completely assembled during this process.

Although such is not illustrated, the inner race of the pivot connection could be mounted on vertical tracks which would allow occasional vertical positioning of the entire ramp assembly with respect to the sea level as the latter changes from time to time for example in tidal areas.

The king post 194 is equipped with hand rail 196 to assist personnel 10 as they reach platform 197. An access deck 198 (shown in a close-up view in FIG. 30) is provided on the platform structure 12 for access to the platform 197 of the pivot deck 18.

Figure 32:
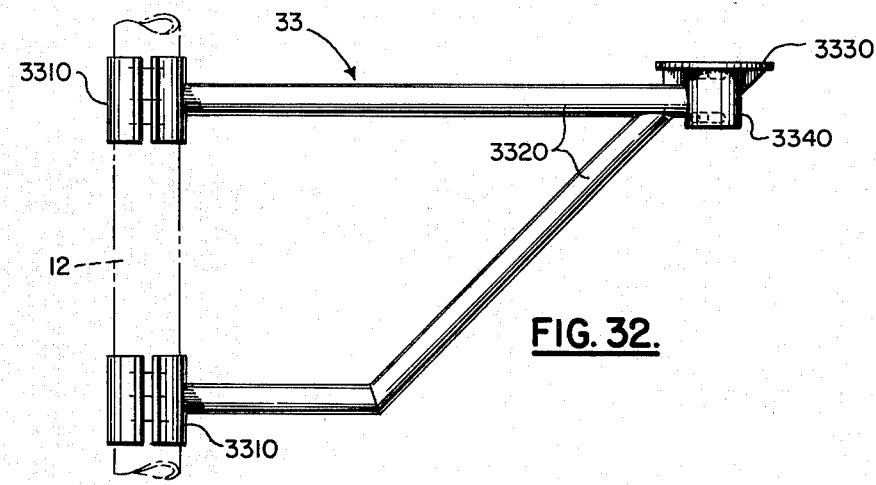
FIG. 32 is a side, elevational view of the tie back cradle of FIG. 31.

Suitable cradle means 33 (note FIGS. 31 and 32) are also provided on the platform structure to attach the outboard end of the ramp 16 back into the platform 12 in anticipation of a storm, etc. The circular plate flange 3,330 on the tieback pedestal 3,340 of the cradle 33 is the same diameter as the flange plate 1,501 on the boat pedestal 15 and fastening thereto is accomplished in the same manner as described above in reference to the boat attacher 14. As shown in FIG. 32, the cradle 33 includes an appropriate frame 3,320 and is fastened in a suitable position to the platform structure 12 by suitable saddle fasteners 3,310.

Figure 33:
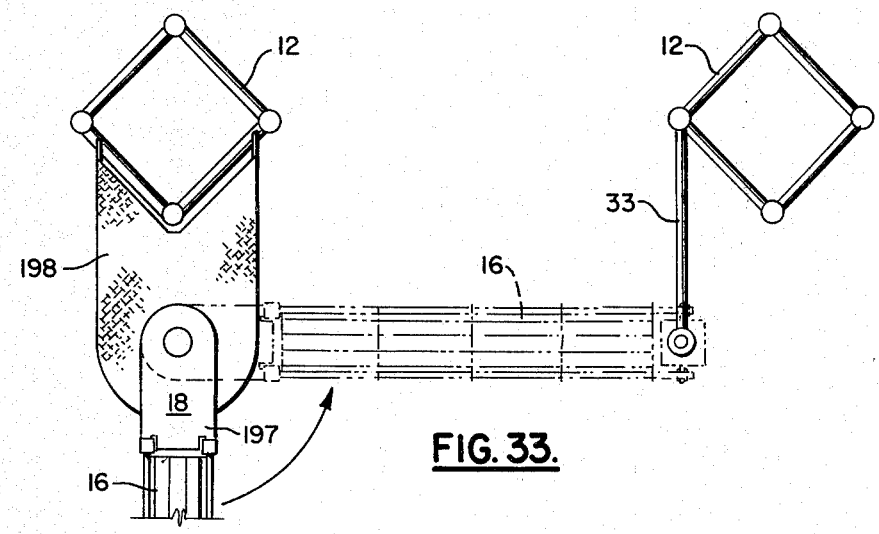
FIG. 33 is a plan view of the preferred embodiment of the ramp system of the present invention showing the arrangement of the ramp in the tie back position.

As shown in FIG. 33, the ramp 16, in an up, horizontal position, is rotated into the tie-back cradle area. This rotation can be accomplished by a boat maneuvering the ramp by manipulating the hang line 1,418 of FIG. 19, located on the outboard end of ramp 16. After the ramp 16 is positioned in juxtaposition to the tie-back pedestal 3,340, the hang line is released from the boat 11 and is passed through the center hole 3,350 of the tie-back pedestal 3,340, after which the boat again secures the end of the hang line by its winch line. By applying tension to the hang line from the boat, attacher 14 is exactly positioned over the tie-back pedestal 3,340 and is pulled down into an attached, latched condition. The hang line is then released from the boat winch line, and the ramp 16 is secured for the storm.

Figure 34:
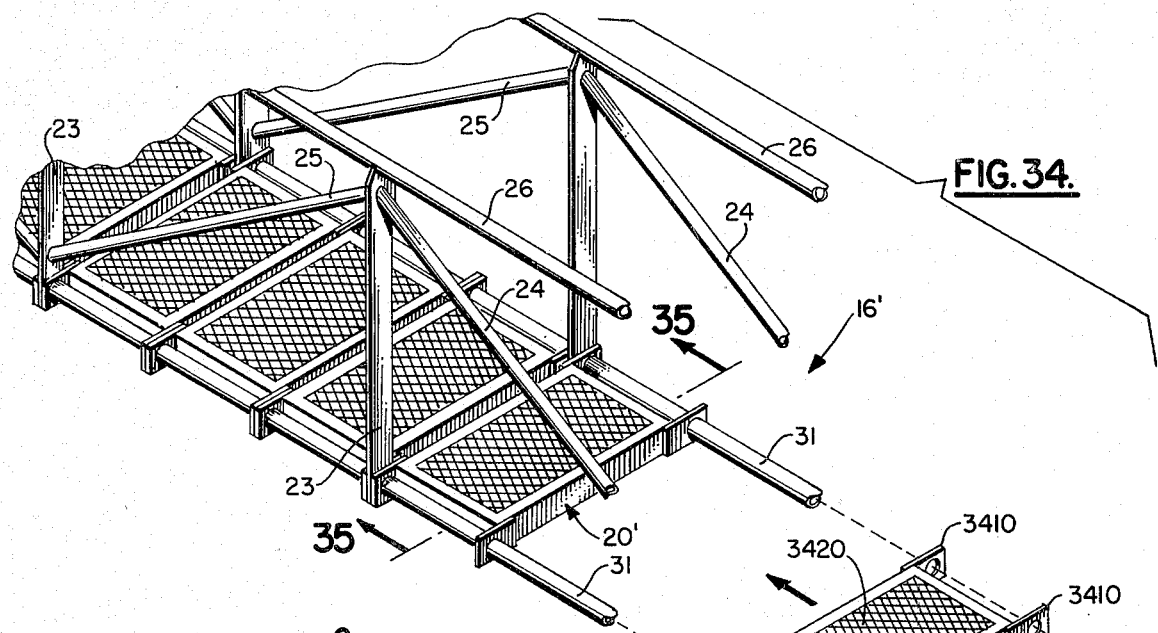
FIG. 34 is a perspective, partially cut away and exploded view of the ramp structure of an alternate embodiment of the ramp system of the present invention showing the structural arrangement which will allow greater assembly flexibility of the ramp system.
Figure 35:
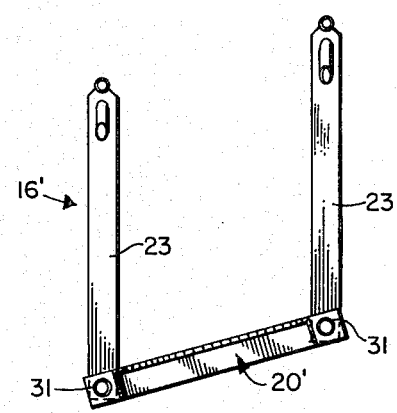
FIG. 35 is an end cross-sectional view of the alternate embodiment of the ramp system of the present invention taken along section line 35—35 of FIG. 34 indicating the parallelogram configuration of the hand rail trusses which remain vertical as the deck conforms to the movement of the boat deck.

Alternate Embodiment of Ramp: FIGS. 34 & 35

Figure 3:
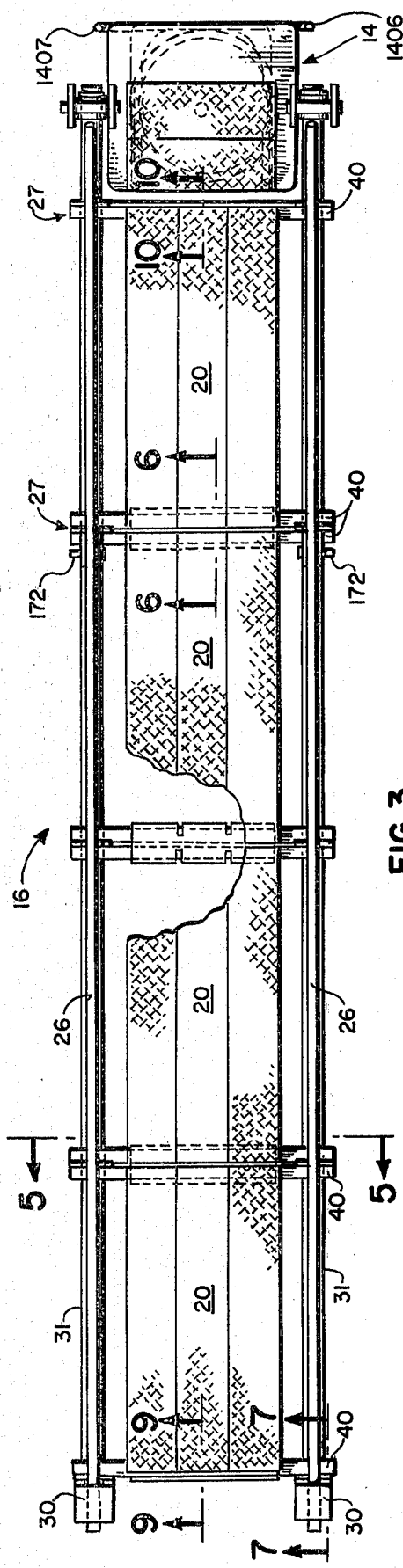
FIG. 3 is a top, partially elevated cross-sectional view of the preferred embodiment of the ramp system of the present invention showing the flexible ramp assembly.
Figure 4:
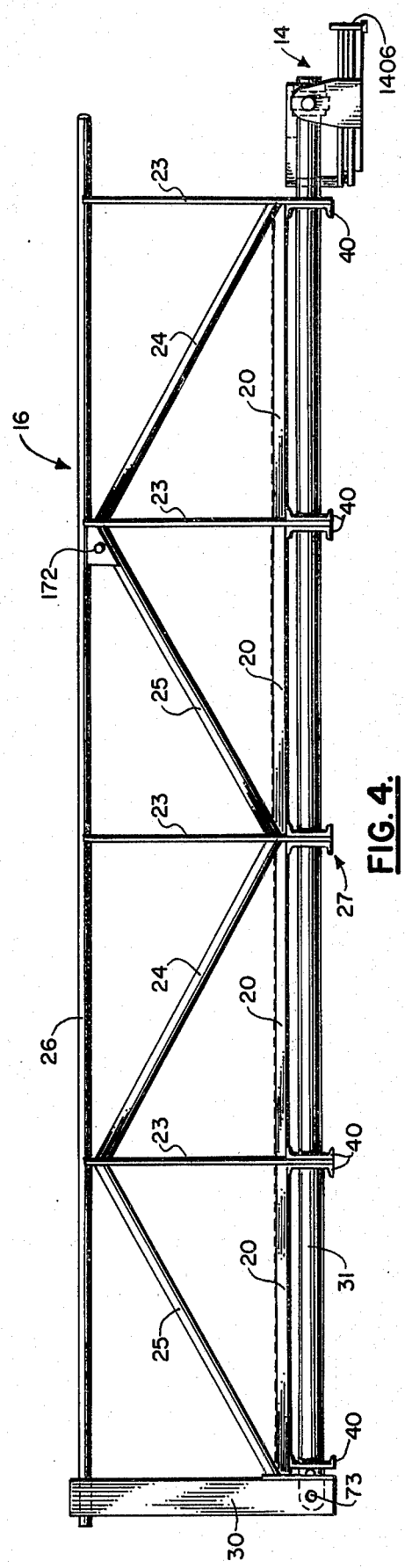
FIG. 4 is a side elevational view of the preferred embodiment of the ramp system of the present invention showing the flexible ramp assembly.

In an alternate embodiment 16' of the ramp structure of the present invention illustrated in FIGS. 34 and 35, the structure of ramp 16 previously is slightly altered in the fabrication of the decking 20 from that shown in FIG. 3 to that shown in FIG. 34 and 35, but otherwise the altered embodiment 16' is the same and exhibits the same flexible but solid ramp characteristics discussed above. In the alternate embodiment of FIG. 34, the decking 20' is composed of box structure 3,430 with grating 3,420 as the walking surface. The deck sections 20' are strung on the stringers 31 through brackets 3,410 having holes 3,440 therethrough that act as a hinge connection to the stringers 31.

Other decking modifications are of course possible. Indeed rather than separate solid deck sections it is conceivable that the entire decking area could be provided by a continuous flexible membrane stretched under sufficient tension to be relatively solid, but which would allow independent movement of itself about the stringers by its very elasticity. Alternatively, a series of longitudinally supported cables under tension or longitudinally disposed solid members, located parallel to the outboard stringers, could be provided for the decking surface areas, in which case the laterally disposed terminal end members would serve as the supporting lateral means of the ramp.

Figure 37:
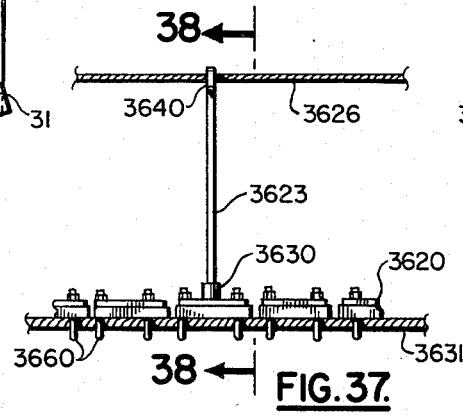
FIG. 37 is a partial, elevation view of the alternate embodiment of FIG. 36 of the ramp system of the present invention showing the ramp structure.
Figure 38:
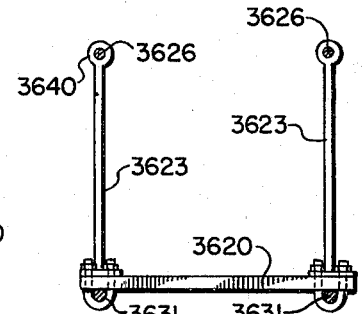
FIG. 38 is an end cross-sectional view of the alternate embodiment of FIG. 36 of the ramp system of the present invention taken along section lines 38—38 of FIG. 37.
Figure 36:
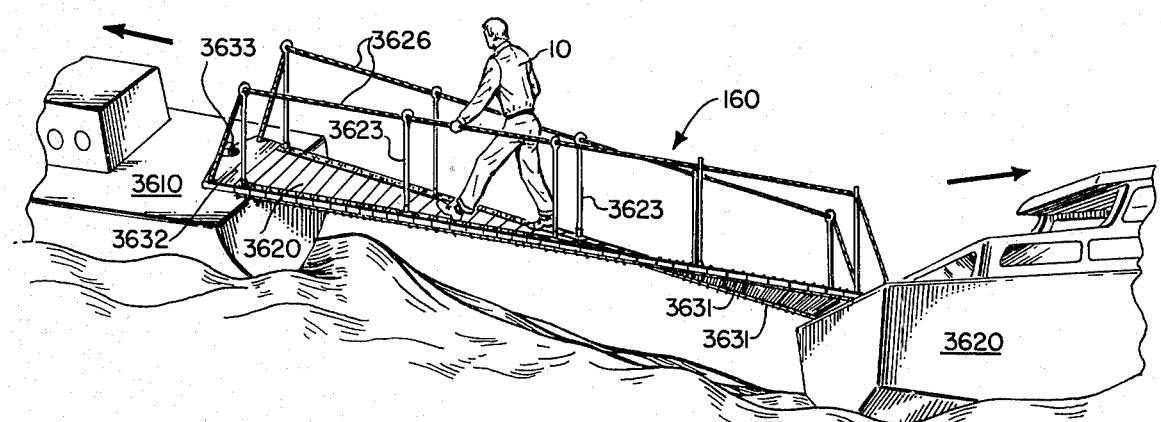
FIG. 36 is a perspective view of an alternate embodiment of the ramp system of the present invention showing another structural arrangement where the stringer members are a flexible line. This is a totally flexible arrangement and requires the boats to pull away from each other in order to make the ramps stiff enough to be walked across. This arrangement allows the hand rails to be folded inboard which will allow the whole structure to be rolled up to insure minimum storage space necessary for the structure.

Boat/Boat Embodiment: FIGS. 36–38

Another alternate embodiment of the present invention is shown in FIGS. 36–38 wherein the ramp structure 160 is used to transport personnel and/or material between two moving objects such as from boat 3,620 to boat 3,610. This embodiment of the ramp structure, utilizing cable stringers 3,631, is inherently very flexible along its length and requires longitudinal tension by the boats pulling away from each other in order to make it rigid enough for weight to be transported across it and to have the relative solidity required in the present invention.

The flexible stringer members 3,631 are fastened to the rigid end fasteners 3,632 which are equipped with suitable means (e.g., locking pivot connections) to allow it to pivot about a post 3,633, thereby permitting even tension applied to each of the flexible stringer members 3,631. Deck members 3,620 are fastened across the stringer members 3,631 by a suitable means such as U bolts 3,660. This arrangement allows movement of the deck in all directions and with it still remaining structurally sound.

Vertical stanchions 3,623 are spaced along the deck sections 3,620 in order to position the cable handrails 3,626 by means of an eye 3,640 or other suitable means. These stanchions 3,623 are fastened to the deck sections by suitable means 3,630 which preferably allows them to be folded inboard and the whole ramp 160 rolled up for minimum storage. With the appropriate tension applied across the ramp 160, making the cable stringers 3,631 rigid, the "cable" ramp 160 will exhibit the same torsion characteristics and twisting capabilities, as described above with respect to the ramp 16 with its rigid pipe stringers 31.

In reference to the boat-to-boat embodiment, it is conceivable to attain the same results of the flexibility condition by use of different construction material for the decking such as a sheet of rubber or plastic or any other material which has tension ability as well as a high elastic quality which would enable it to be used and still remain structurally sound. In effect, in such embodiments, the outboard edges serve as the stringer members.

Second Platform/Boat Embodiment: FIGS. 39 & 40

Another alternate embodiment of the present invention is shown in FIG. 39. The flexible ramp 160' is made of cable stringers 3,931, vertical stantions 3,923 and deck sections 3,920 similar to those shown with respect to ramp 160 in FIGS. 36 and 37. However the ramp 160' is held out in an extended position by a solid pipe jackstay 3,950 which is equipped with hanger spreader members 3,952 which can rotate independently of each other around the jackstay 3,950 by a bushing 3,951 as shown in comparing FIGS. 40A and B. Vertical support lines or hanger cables 3,917 are fixed to the lateral ends of the spreaders 3,952 and are fastened to the vertical stanchions 3,923 in order to support the ramp 160' when it is not in tension.

The jackstay 3,950 is hinged to the swivel head assembly 3,980 by hinge pin 3,981 which allows vertical movement. The swivel head assembly 3,980 is constructed to pivot around the king post 3,9194 as is the bottom ramp pivot structure 3,918.

A counterweight 3,9192 is located inside of the king post in order to lift the ramp structure 160' by means of an attached lift line 3,9172 which follows over a sheave 3,9173 located in the center top of the swivel head and is attached to the outboard end of the jackstay 3,950 by means of a padeye 3,960.

An attaching hang line 3,918 is located in the center of the outboard end of the ramp 160'. A boat will attach its winch line through a suitable fitting means 3,919 to the hang line 3,918 and winch the ramp down to the boat deck. The boat must pull on the ramp 16 because of the cable construction of its stringer 3,931 in order to make it rigid in the same manner as discussed above with respect to the boat-to-boat embodiment of FIG. 36.

Caisson Embodiment: FIGS. 41 & 41A

Another alternate embodiment of the present invention is shown in FIG. 41 wherein the ramp 4,116 is attached from a vessel 4,111 to a single caisson production platform 4,112 by means of rotatable fastening 4,118. This arrangement allows 360° rotation of the boat 4,111 around the caisson 4,112. The ramp structure 4,116 complete with the boat attacher 4,114 and boat pedestal 4,115 are comparable to the analogous elements 14–16 of FIG. 1 as described above, except the counterweight 4,130 is extended on the opposite side of the vertical hinge pin 4,173 by a truss structure 4,150.

As illustrated in FIG. 41A, a walking beam 4,160 is provided to connect through pivoting connections the top chord 4,126 of the truss handrails on ramp 4,116 with the top chord 4,127 of the triangular truss 4,150 which supports the counterweight 4,130. The ramp 4,116 is connected by pin connectors 4,119/4,120 to the connector link arms 4,113, 4,113', while the connector link arms 4,113, 4,113' are connected by pin connectors 4,110/4,121 and 4,110'/4,121' to the walking beam 4,160. The walking beam 4,160 in turn is connected to the top chord 4,127 of the truss 4,150 by a pin connector 4,122/4,123. The two bottom chords 4,128, 4,128' of the truss structure 4,150 and the stringer members 4,131 of the ramp 4,116 are connected together at the hinge pin 4,173.

This walking beam connection arrangement allows the ramp 4,116 to be flexible transversely even though it is attached to the counterweight truss 4,150, which is completely rigid and fixed, by its ability to compensate for the lateral movement of the ramp 4,116 and transmit the load to a single stable point by pin 4,123. This separate cross connection arrangement also allows the ramps to be, in a sense "off-the-shelf" items rather than each installation being a completely custom job.

The counterweight system 4,130/4,150 is designed to exactly counterbalance the weight of the ramp section 4,116 so that the combined structure will rise to the horizontal when not in use. When desired for use, the ramp 4,116 can be put into operation utilizing the same hang rope/winching technique described above, It is further noted that in case of an anticipitate storm or hurricane, the entire ramp structure 4,116/4,150 can be quickly released from its hinge structure and lowered by a cable arrangement well below the surface of the water, where it will not be affected by waves or wind.

Figure 42:
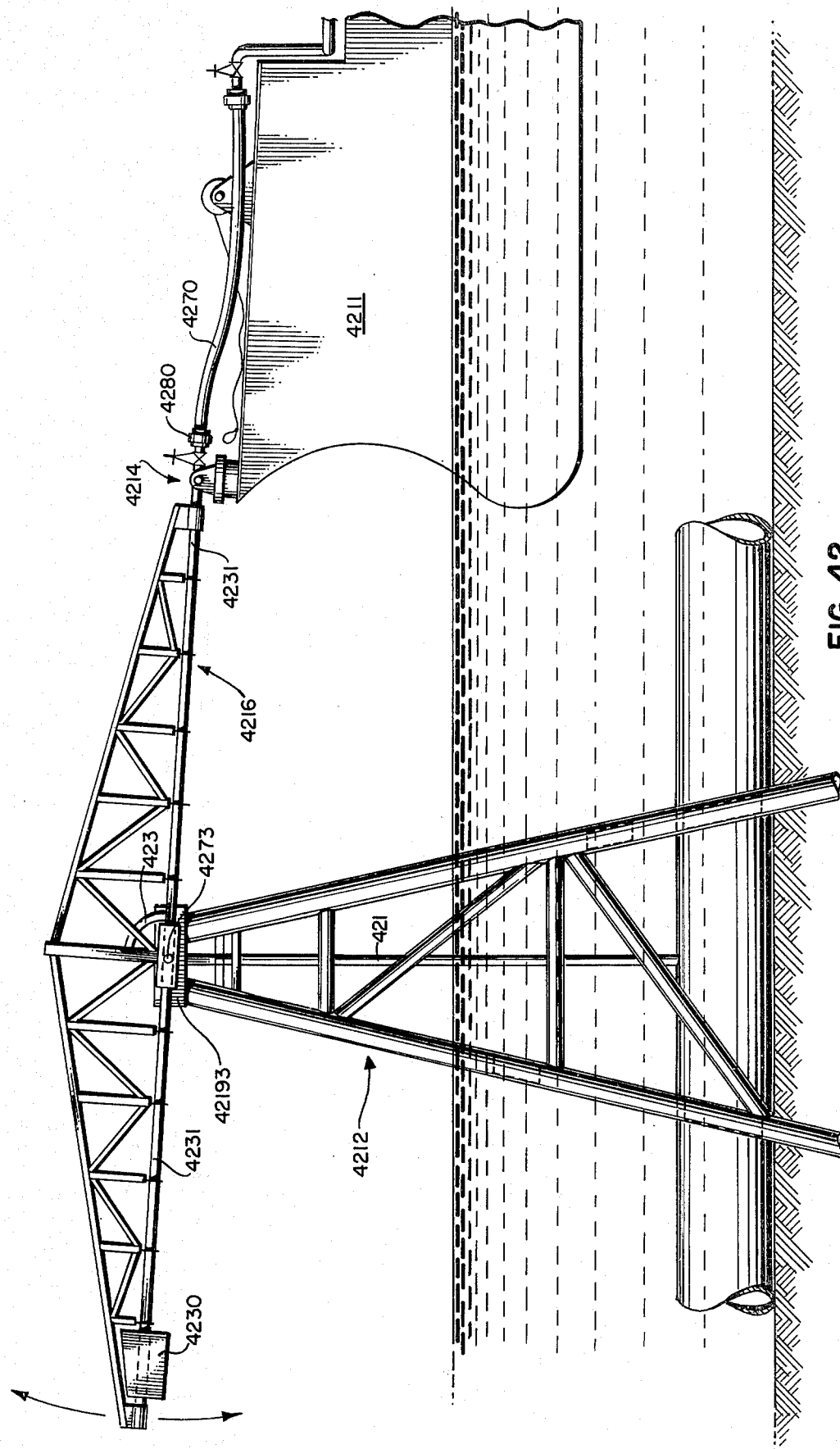
FIG. 42 is a side view of an alternate embodiment of the ramp system of the present invention showing an arrangement suitable for superport type operations where the flexible ramp can rotate about the mooring pedestal. A flow line is included in the center of the mooring pedestal equipped with a double swivel which allows fluid transfer from the ship through its stringer members.

Superport Type Embodiment: FIG. 42

Figure 43:
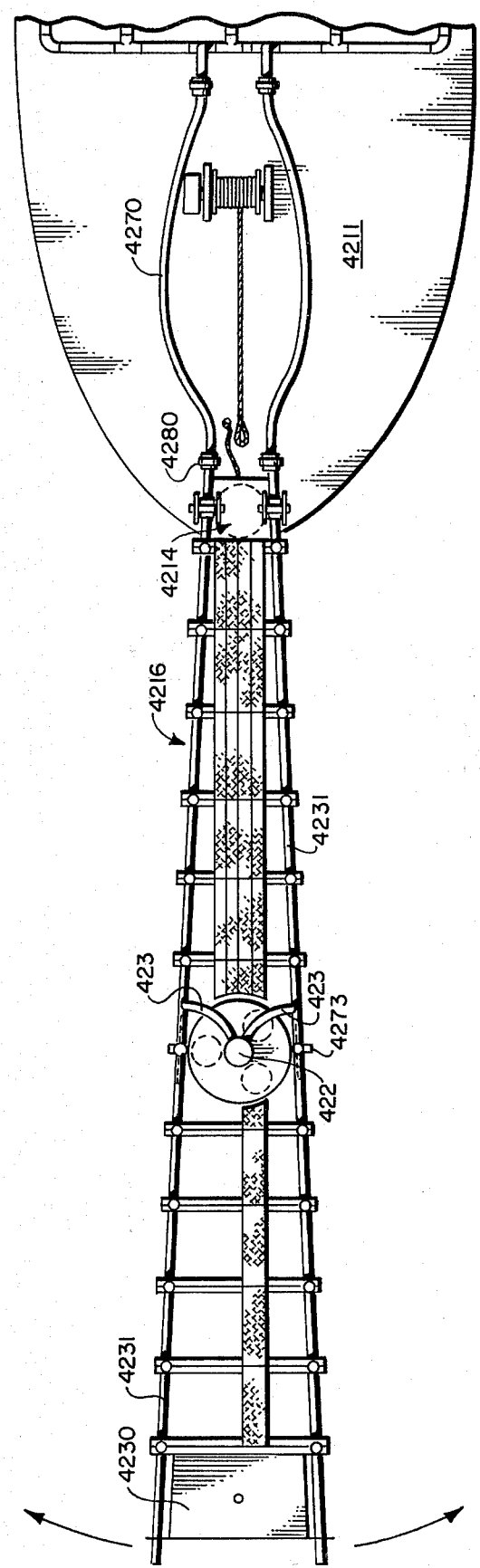
FIG. 43 is a top elevational view of the alternate embodiment of FIG. 42 of the ramp system of the present invention.

Another alternate embodiment of the present invention is shown in FIGS. 42 and 43. This arrangement will lend itself well to a superport type mooring facility. The ramp 4,216 is constructed in a manner analogous to the ramp 16 of FIG. 1 and has all its flexible and torsional capabilities. However, its counterweight 4,230 is extended by the same type of ramp structure on the opposite side of pivot pin 4,273 wich allows vertical movement. The ramp 4116 has the ability to rotate 360° around the mooring pedestal 4,212, allowing weathervaning, which is accomplished by a large radial bearing 42,193 which is similar in structure to the bearing structures described with reference to FIGS. 24–29 between the king post 194 and the pivot deck 18. An additional feature is included in this embodiment in that the stringer members 4,231 not only serves the purpose of forming the main structural members but are also used to transport liquid cargo between the tanker ship 4,211 to the flow line 421 located in the center of the mooring pedestal 4,212 by means of a suitable swivel connection 422 and flexible lines 423. The boat attacher 4,214 positions the ends of the stringer members 4,231 in a very desirable location in order to make up the flexible fluid transfer line 4,270 by means of a suitable fitting 4,280.

Personnel and material transfer can also be accomplished in the same manner as described with reference to the other embodiments.

It is noted that, as with the other solid ramp embodiments described above, the ramp 4,216 maintains a constant length as it moors the tanker 4,216. This constant length mooring system has a definite advantage over conventional anchoring or mooring line systems because it can control the horizontal acceleration of the movement of the ship, whereas a mooring line will become slack and allow considerable horizontal acceleration. The impact of stopping such a massive movement exerts tremendous forces on whatever mooring structures are involved. Whereas, in contrast, the massiveness of the ship 4,211 is an advantage in the present invention because the great inertia ability of the ship will absorb most of the wave energy that strikes the bow. The forces exerted on the mooring pedestal and attacher system 4,214/4,215 involve only a small portion of the wave energy that strikes the bow, plus the skin friction caused by the flow of the ocean, and the wind which will be minimal since the system has the ability to weathervane.

Boat/Barge Embodiment: FIGS. 44–47

Another alternate embodiment of the present invention showing the ramp connection between a boat 4,411 and a barge 4.412 (e.g, a lay barge) is shown in FIGS. 44–47. The ramp 4,416 and its connection through attacher 4,414 and pedestal 4,415 with the boat 4,411 are the same as or very similar to that for the most preferred embodiment (FIG. 1). However, this embodiment uses a counterweight 44,192 without the use of a king post.

In this embodiment, the king post assembly is replaced with a fixed counterweight well 4,410 that is located on barge 4,412. The counterweight 44,192 housed in rotatable housing 4,411 is lowered into this well 4,410 using the beveled end 4,421 of the counterweight housing 4,411 for stabbing purposes, the entire assembly being supported through padeyes 4,490. Fluid is placed in chamber 4,422 for dampening purposes. Dual cables 44,171 are attached to the counterweight 44,192 through lift or padeyes 4,490. Braces 4,492 anf 4,493 are also added for additional strength. The counterweight cables 44,171, which are conducted over the sheaves 44,173 and attached to the top chords of the vertical trusses 4,426, will lift the ramp 4,416 as it pivots about its hinge pins 4,473.

The ramp 4,416 with its pivot deck 4,418 along with the counterweight housing 4,411 rotates on bearing 4,440 about the counterweight well 4,410. The pivot deck 4,418 is welded to the counterweight housing 4,411 making it a rigid housing. Thus rotation about an axis vertical to the plane of the barge deck is accomplished by the counterweight housing 4,411 rotating inside of the barge well 4,410.

Although the docking pedestal 4,415 is similar to docking pedestal 15 of the most preferred embodiment, there are structural differences, as best illustrated in FIG. 47, and the method of connecting the boat 4,411 to the ramp 4,416 is different. The winch 446 in this embodiment is located on the barge end of the ramp structure 4,416. As illustrated in FIG. 46, winch 446 utilizes connecting cable 445 which is guided by sheaves 4,470 through an appropriate channel in the deck 4,420. As best seen in FIG. 47, the docking pedestal 4,415 comprises a cylindrical section 4,452 carrying at its top a circular flange plate 4451 having a central aperture 4,454 therein. Communicating with the aperture 4,454 is a slotted section 4,453 which serves as the entrance slot for the cable connecting element head 4,419 attached to the terminal end of cable 445.

When it is desired to connect the ramp 4,416 to the boat 4,411, the cable 445 is hung out over the boat end of the ramp and the connecting element head 4,419 is placed within the slotted section 4,453 which is wide enough to allow its entry. However, the aperture 4,454 and the communicating portion of the slotted section 4,453, although large enough to accept the cable 445, is smaller than the connecting element head 4,419, and hence the end of the cable 445 is trapped within the docking pedestal 4,415. The winch 446 then pulls the cable 445 in, drawing the boat attacher 4,414 (which can be identical to attacher 14) under the pedestal 4,415, latching the two together.

It is noted that the ramp 4,416 also can be used between for example a tug and a river-type barge, wherein the ramp 4,416 not only serves as a personnel transfer device but also can serve as the towing connection by appropriately beefing up the mechanical elements of the system.

Although the structures and techniques described in detail above have been found to be most satisfactory and preferred, many variations in their structure or use are, of course, possible. Indeed, the above alternate embodiments are merely exemplary of the many possible changes or variations possible within the present invention.

Because many variations and different embodiments may be made within the scope of the inventive concept herein taught, and because many modifications may be made in the embodiments herein detailed in accordance with descriptive requirements of the law, it is to be understood that the details herein are to be interpreted as illustrative and not in a limiting sense.

What is claimed as invention is:

1. A marine ramp transfer system, wherein personnel and/or material are to be transferred between two relatively moving objects, such as for example a marine vessel and a fixed structure or another vessel at sea, capable of use in both calm and rough weather conditions, comprising the following mechanical elements:

elongated ramp means of significant width being at least connectable between said relatively moving objects for supporting the personnel or material during the transfer between the objects and for producing a gradual transition for the personnel or material in the amount of relative motion between the objects being accomodated, said ramp means including - at least two opposed, at least relatively stiff, longitudinal stringer members separated from each other in a lateral direction a significant distance and extending the length of said ramp means, said stringer members being rigid when in use;

at least two lateral means connected across said stringer members for supporting a deck surface; and deck surface means connected between said stringer members and supported by said lateral means for providing a support surface on which the personnel or material are transferred;

said stringer members being substantially fixed in separation distance between each other but movable with respect to each other in a longitudinal, "vertical" plane, and the ends of each said lateral means with each said deck surface area being independently rotatable or otherwise moveable about a longitudinal axis in their respective connections to said stringer members, whereby said ramp means is flexible along its length in a lateral plane; and two, separate ramp connection means each for connecting a respective end of said ramp means through said stringer members to one of the relatively moving objects for causing its respective end of the ramp means to assume a lateral direction the same alignment as that of the major "horizontal" plane of the object, the lateral alignment of at least one of which objects is changing with respect to the other in their relative movement; whereby said ramp means through its flexible structure and its end connections gradualize the relative motion between the objects in a directly proportional manner.

2. The system of claim 1 wherein said two, separate connection means each further allows its respective end of the ramp to separately pivot about the object about both a pivot axis perpendicular to and a hinge axis parallel to the major "horizontal" plane of the object.

3. The system of claim 2 wherein said transfer system also provides mooring capability, being a combined marine ramp transfer and mooring system, and wherein said two connection means are fixed with respect to the objects when in use, the two vertical pivoting axes being fixedly located with respect to the objects and said ramp means having a constant length.

4. The system of claim 3 wherein the forces created by the relative movement of the objects is transmitted between the objects only through said stringer members.

5. The system of claim 4 wherein said stringer members are naturally rigid, elongated cylindrical members.

6. The system of claim 4 wherein said stringer members are lines or cables which in use are held under sufficient tension to become rigid, with each one following a substantially straight line along its length.

7. The system of claim 1 wherein said ramp means further includes opposed side structures connected to and projecting up from said stringer members, each said side structure being rotatable about a longitudinal axis in its respective connection to its respective stringer members.

8. The system of claim 7 wherein said side structure and said lateral members in their connections with said stringer members always form a parallelogram configuration even when said stringer members move with respect to each other in the longitudinal, "vertical" plane during use of the ramp means.

9. The system of claim 8 wherein one of the objects is a relatively stationary structure such as for example an at least relatively fixed platform which maintains at least a substantially constantly aligned horizontal platform surface, and wherein said side structures maintain a constantly vertical disposition even when said stringer members move with respect to each other in the longitudinal, vertical plane.

10. The system of claim 9 wherein each of said side structures further includes at least one longitudinal member positioned above its respective stringer member and extending the length of said ramp means, said side structures forming side trusses with said stringer members and said longitudinal members, said stringer members forming the bottom chords and said longitudinal members forming the top chords of the side trusses.

11. The system of claim 10 wherein said side structures and said deck section means form a containment structure for the personnel and/or material being transferred between the objects.

12. The system of claim 11 wherein said longitudinal member form handrails.

13. The system of claim 10 wherein said longitudinal members are fixed with respect to the other elements of said side structures.

14. The system of claim 13 wherein said side structures comprise a series of upwardly projecting members having flat sections at their bottoms with their flat planes being perpendicular to the longitudinal axis of said ramp means and having circular holes therein through which said stringer members are positioned and which form their rotatable connection to said stringer members.

15. The system of claim 1 wherein said stringer members have a circular cross-section and said lateral means have circular apertures therein through which said stringer members are positioned and which form their rotatable connection to said stringer members.

16. The system of claim 1 wherein said ramp is relatively permanently connected to one of the objects and only intermittently attached to the other, the relatively permanent connection means between said ramp means and the object includes rotatable connection means rotatably attached to the object for pivoting about a pivot axis perpendicular to the major horizontal plane of the object, said ramp means being attached to said rotatable connection means by means of a hinge pin arrangement which allows said ramp means to pivot about a hinge axis perpendicular to said pivot axis.

17. The system of claim 16 wherein there is further included a counterbalancing means connected to said ramp means for biasing said ramp means in an "up" position above the position it takes in use when connected between the two objects.

18. The system of claim 17 wherein said counterbalancing means includes a counterweight connected to said ramp means.

19. The system of claim 18 wherein said counterweight is located on a rigid structure connected to said ramp means but extending on the opposite side of said hinge axis from said ramp means.

20. The system of claim 18 wherein said counterweight is connected to said ramp means at a point substantially removed from said hinge axis by a line or cable which suspends said counterweight for straight line movement along a line coinciding with said pivot axis.

21. The system of claim 20 wherein said counterweight is suspended within an enclosed chamber having fluid therein, said counterweight moving in said chamber with said fluid therein serving as a shock absorber for said ramp means in its various movements.

22. The system of claim 17 wherein the intermittently attached connection means, which is connected to a marine vessel, also allows its respective end of said ramp means to separately pivot about its object about both a pivot axis perpendicular to and a hinge axis parallel to the major horizontal plane of its object, namely the vessel, and wherein said transfer system also provides mooring capability, being a combined marine ramp transfer and mooring system, and wherein said two connection means are fixed with respect to the objects when in use, the two vertical pivoting axes being fixedly located with respect to the objects and said ramp means having a constant length, and wherein said counterbalancing means serves to stabilize the relative motion of the marine vessel by providing a lift through said intermittently attached connection means to the marine vessel.

23. The system of claim 16 wherein the intermittently attached connection means, which is connected to a marine vessel, also allows its respective end of said ramp means to separately pivot about its object about both a pivot axis perpendicular to and a hinge axis parallel to the major horizontal plane of its object, namely the vessel, and wherein said transfer system also provides mooring capability, being a combined marine ramp transfer and mooring system, and wherein said two connection means are fixed with respect to the objects when in use, the two vertical pivoting axes being fixedly located with respect to the objects and said ramp means having a constant length, and wherein the said intermittently attached connection means, which is connected to the marine vessel, includes a latching device, and wherein the marine vessel includes a docking pedestal having a circular flange plate centrally located at its top and extending outwardly therefrom, said latching device being connectable over and around said docking pedestal and latchable to the extending portion of said circular flange plate, the docking pedestal and flange plate defining at its center said pivot axis for said intermittently attached connection means.

24. The system of claim 23 wherein said intermittently attached connection means further includes a hang line hanging from said latching device, and wherein the docking pedestal on the marine vessel includes an aperture at its center, said latching device being connectable to the docking pedestal by connecting the hang line to the marine vessel through the aperture and pulling the hang line to bring said latching device and the docking pedestal together.

25. The system of claim 16 wherein the intermittently attached connection means, which is connected to a marine vessel, also allows its respective end of said ramp means to separately pivot about its object about both a pivot axis perpendicular to and a hinge axis parallel to the major horizontal plane of its object, namely the vessel, and wherein said intermittently attached connection means in the fastening of said stringer members to the hinge axis connections allows each said hinge axis connections to rotate about a longitudinal axis in its respective connection to its respective stringer member.

26. The system of claim 25 wherein said relatively permanent connection means in the fastening of said stringer members to the hinge axis connections prevents each said hinge axis connections from rotating about a longitudinal axis in its respective connection to its respective stringer member.

27. The system of claim 16 wherein said relatively permanent connection means comprises a pivot deck which at one end is pivotably connected to its respective object and at its other end is hingedly connected to said ramp means.

28. The system of claim 20 wherein said relatively permanent connection means is connected to the deck of a marine structure, the marine structure including a well in the deck located under where said connection means connects to said deck, and wherein said counterweight is suspended within a housing which is fixedly attached to said connection means and rotatably suspended in the well; whereby said counterbalancing means adds no significant vertical height to the marine structure above the ramp means itself.

29. The system of claim 16 wherein there is further included cradle means on the respective object of said relatively permanent connection means, said ramp means being connectable through its intermittently attached connection means to said cradle for secure storage of said ramp means when not in use.

30. The system of claim 1 wherein the length of said ramp means has a ratio of approximately two-to-one in comparison to the expected maximum wave height.

31. The system of claim 1 wherein the length of said ramp means has a ratio of approximately six-to-one in comparison to its width.

32. A ramp transfer system, wherein personnel and/or material are to be transferred between two relatively moving objects, the relative motion including movement in a vertical direction and lateral pitching as well, comprising the following mechanical elements:
elongated ramp means of significant width being at least connectable between said relatively moving objects for supporting the personnel or material during the transfer between the objects and for producing a gradual transition for the personnel or material in the amount of relative motion between the objects being accommodated, said ramp means including
at least two opposed, at least relatively stiff, longitudinal stringer members sperated from each other in a lateral direction a significant distance and extending the length of said ramp means, said stringer members being substantially fixed in separation distance between each other but movable with respect to each other in a longitudinal, vertical plane, said stringer members being rigid when in use, the forces created by the relative movement of the objects being transmitted between the objects through said stringer members;

opposed side structures connected to and projecting up from said stringer members, each said side structures being rotatable about a longitudinal axis in its respective connection to its respective stringer member, each of said side structures further including at least one longitudinal member positioned above its respective stringer member and extending the length of said ramp means, said side structures forming side trusses with said stringer members and said longitudinal members, said stringer members forming the bottom chords and said longitudinal members forming the top chords of the side trusses;

at least two lateral means connected across said stringer members for supporting a deck surface, said side structure and said lateral members and their connections with said stringer members always forming a parallelogram configuration even when said stringer members move with respect to each other in the longitudinal, vertical plane during use of the ramp means; and deck, surface means connected between said stringer members and supported by said lateral means for providing a support surface on which the personnel or material are transferred, the ends of each said lateral means with each said deck surface area being independently rotatable or otherwise moveable about a longitudinal axis in their respective connections to said stringer members;

whereby said ramp means is flexible along its length in a lateral plane; and two, separate ramp connecction means each for connecting a respective end of said ramp means through said stringer members to one of the relatively moving objects for causing its respective end of the ramp means to assure in a lateral direction the same alignment as that of the major horizontal plane of the object; whereby said ramp means through its flexible structure and its end connections gradualize the relative motion between the objects in a directly proportional manner.

33. The system of claim 32 wherein said two, separate connection means further allows its respective end of the ramp to separately pivot about the object about both a pivot axis perpendicular to and a hinge axis parallel to the major horizontal plane of the object, said two connection means being fixed with respect to the objects when in use, the two vertical pivoting axes being fixedly located with respect to the objects and said ramp means having a constant length with said stringer members following a straight line throughout their length.

34. The system of claim 32 wherein said longitudinal members are fixed with respect to the other elements of said side structures.

35. The system of claim 32 wherein said stringer members have a circular cross-section in the lateral plane and wherein said side structures include a series of vertical members, said vertical members and said lateral means having circular apertures therein through which said stringer members are positioned and which form their rotatable connections to said stringer members.

36. The system of claim 33 wherein one of the objects is relatively stable and the other object relatively unstable, and wherein the hinged axis connection of the connection means to the relatively stable object which allows the pivoting about said hinge axis prevents any rotation of itself about a longitudinal axis in its respective connection to its respective stringer member; while the corresponding hinged axis connection of the connection means to the relatively unstable object is capable of rotation about a longitudinal axis in its respective connection to its respective stringer member.

* * * * *